US009671716B2

(12) United States Patent
Watanabe et al.

(10) Patent No.: US 9,671,716 B2
(45) Date of Patent: Jun. 6, 2017

(54) IMAGE FORMING APPARATUS AND CORRECTION DATA GENERATION METHOD WHICH CORRECTS THE INTENSITY OF A LIGHT SOURCE WHICH FORMS A LATENT IMAGE

(71) Applicants: Naoto Watanabe, Kanagawa (JP); Shuji Hirai, Tokyo (JP); Satoshi Kaneko, Kanagawa (JP); Terumichi Ochi, Kanagawa (JP); Muneaki Iwata, Kanagawa (JP)

(72) Inventors: Naoto Watanabe, Kanagawa (JP); Shuji Hirai, Tokyo (JP); Satoshi Kaneko, Kanagawa (JP); Terumichi Ochi, Kanagawa (JP); Muneaki Iwata, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/009,990

(22) Filed: Jan. 29, 2016

(65) Prior Publication Data

US 2016/0223934 A1 Aug. 4, 2016

(30) Foreign Application Priority Data

Feb. 4, 2015 (JP) ................. 2015-020535

(51) Int. Cl.
*G03G 15/00* (2006.01)
*G03G 15/043* (2006.01)
(Continued)

(52) U.S. Cl.
CPC ............. *G03G 15/043* (2013.01); *H04N 1/04* (2013.01); *H04N 1/06* (2013.01)

(58) Field of Classification Search
CPC .................................................... G03G 15/043
(Continued)

(56) References Cited

U.S. PATENT DOCUMENTS

2008/0075476 A1   3/2008   Nakazato et al.
2008/0253793 A1   10/2008   Ishibashi et al.
(Continued)

FOREIGN PATENT DOCUMENTS

JP   2014-164202   9/2014

OTHER PUBLICATIONS

U.S. Appl. No. 14/802,322, filed Jul. 17, 2015.
U.S. Appl. No. 14/924,826, filed Oct. 28, 2015.

*Primary Examiner* — Quana M Grainger
(74) *Attorney, Agent, or Firm* — Oblon, McClelland, Maier & Neustadt, L.L.P.

(57) ABSTRACT

An image forming apparatus includes: a latent image forming unit that forms a latent image on a latent image bearer with light from a light source; and a correction data generating unit that includes: an acquiring unit that acquires, for each position, a correction value of an intensity of the light source to equalize a density distribution of a latent image; a quantizing unit that generates a correction data for each position by quantizing a correction value for each position; and an excessive correction suppressing unit that outputs the correction data after reducing an amount of change from an immediately preceding latent image formation position, with respect to a position at which an absolute value of a restored value indicating a correction amount and generated based on the correction data exceeds an absolute value of the correction value.

15 Claims, 21 Drawing Sheets

(51) Int. Cl.
*H04N 1/04* (2006.01)
*H04N 1/06* (2006.01)

(58) Field of Classification Search
USPC .................................................. 399/4, 49
See application file for complete search history.

(56) References Cited

U.S. PATENT DOCUMENTS

| | | |
|---|---|---|
| 2009/0238591 A1 | 9/2009 | Watanabe et al. |
| 2009/0324267 A1 | 12/2009 | Yoshida et al. |
| 2010/0278549 A1 | 11/2010 | Ishibashi et al. |
| 2011/0058823 A1 | 3/2011 | Hirai |
| 2012/0099165 A1 | 4/2012 | Omori et al. |
| 2012/0155899 A1 | 6/2012 | Watanabe et al. |
| 2012/0189328 A1 | 7/2012 | Suzuki et al. |
| 2012/0201552 A1 | 8/2012 | Hirai et al. |
| 2013/0108288 A1 | 5/2013 | Kaneko et al. |
| 2013/0108292 A1 | 5/2013 | Suzuki et al. |
| 2013/0243456 A1 | 9/2013 | Kaneko et al. |
| 2013/0243457 A1 | 9/2013 | Kaneko et al. |
| 2013/0302052 A1 | 11/2013 | Iwata et al. |
| 2014/0169814 A1 | 6/2014 | Uematsu et al. |
| 2014/0268242 A1 | 9/2014 | Kaneko et al. |
| 2014/0270827 A1 | 9/2014 | Muto et al. |
| 2014/0270828 A1 | 9/2014 | Suzuki et al. |
| 2014/0301748 A1 | 10/2014 | Suzuki et al. |
| 2015/0116718 A1 | 4/2015 | Ochi et al. |
| 2015/0156373 A1 | 6/2015 | Fujita et al. |
| 2015/0261162 A1 | 9/2015 | Kaneko et al. |
| 2015/0362879 A1 | 12/2015 | Kaneko et al. |

| POSITION | CORRECTION VALUE | DIFFERENCE DATA |
|---|---|---|
| 0 | 1.986693 | 0 |
| 0.001 | 2.821082 | 0 |
| 0.002 | 5.604161 | 0 |
| 0.003 | 8.311779 | 8.311779 |
| 0.004 | 10.90755 | 0 |
| 0.005 | 13.35668 | 0 |
| 0.006 | 15.62647 | 0 |
| 0.007 | 17.68677 | 9.37499 |
| 0.008 | 19.51039 | 0 |

FIG.21

| POSITION | CORRECTION VALUE | DIFFERENCE DATA | CORRECTION DATA QUANTIZED WITH LIMITATION | |
|---|---|---|---|---|
| 0 | 1.986693 | 0 | 0 | |
| 0.001 | 2.821082 | 0 | 0 | |
| 0.002 | 5.604161 | 0 | 0 | |
| 0.003 | 8.311779 | 8.311779 | 4 | ←LIMITED TO 4 BECAUSE EQUAL TO OR GREATER THAN 4 |
| 0.004 | 10.90755 | 0 | 0 | |
| 0.005 | 13.35668 | 0 | 0 | |
| 0.006 | 15.62647 | 0 | 0 | |
| 0.007 | 17.68677 | 9.37499 | 4 | ←LIMITED TO 4 BECAUSE EQUAL TO OR GREATER THAN 4 |
| 0.008 | 19.51039 | 0 | 0 | |
| 0.009 | 21.07352 | 0 | 0 | |
| 0.01 | 22.35602 | 0 | 0 | |
| 0.011 | 23.34173 | 5.65496 | 4 | ←LIMITED TO 4 BECAUSE EQUAL TO OR GREATER THAN 4 |
| 0.012 | 24.01867 | | 0 | |
| 0.013 | 24.37921 | | 0 | |
| 0.014 | 24.42014 | | 0 | |
| 0.015 | 24.14273 | 0.801002 | 1 | ←ONLY ROUND OFF AS INTEGER BECAUSE WITHIN ±4 |

FIG.23

| POSITION | CORREC-TION VALUE | DIFFER-ENCE DATA | CORRECTION DATA QUAN-TIZED WITH LIMITATION | RESTORED VALUE | FLAG DATA | |
|---|---|---|---|---|---|---|
| 0 | 1.986693 | 0 | 0 | | | |
| 0.001 | 2.821082 | 0 | 0 | | | |
| 0.002 | 5.604161 | 0 | 0 | | | |
| 0.003 | 8.311779 | 8.311779 | 4 | 4 | 1 | ← \|CORRECTION VALUE\|≥\|RESTORED VALUE\| |
| ⋮ | | | | | | |
| 0.311 | 6.126888 | 0.69826 | 1 | 0 | 1 | ← \|CORRECTION VALUE\|≥\|RESTORED VALUE\| |
| 0.312 | 5.92213 | 0 | 0 | | | |
| 0.312 | 5.561593 | 0 | 0 | | | |
| 0.314 | 5.048477 | 0 | 0 | | | |
| 0.315 | 4.388964 | -1.73792 | -2 | -2 | 1 | ← \|CORRECTION VALUE\|≥\|RESTORED VALUE\| |
| 0.316 | 3.592139 | | 0 | | | |
| 0.317 | 2.669853 | | 0 | | | |
| 0.318 | 1.636552 | | 0 | | | |
| 0.319 | 0.509039 | -3.87993 | -4 | -6 | 0 | ← \|CORRECTION VALUE\|<\|RESTORED VALUE\| |
| 0.32 | -0.69379 | | 0 | | | |
| 0.321 | -1.95124 | | 0 | | | |
| 0.322 | -3.2412 | | 0 | | | |
| 0.323 | -4.54046 | -5.0495 | -4 | -10 | 0 | ← \|CORRECTION VALUE\|<\|RESTORED VALUE\| |
| 0.324 | -5.82513 | | 0 | | | |
| 0.325 | -7.07107 | | 0 | | | |
| 0.326 | -8.25424 | | 0 | | | |
| 0.327 | -9.35118 | -4.81072 | -4 | -14 | 0 | ← \|CORRECTION VALUE\|<\|RESTORED VALUE\| |

FIG.24

| POSITION | CORREC-TION VALUE | DIFFER-ENCE DATA | CORRECTION DATA QUANTIZED WITH LIMITATION | RESTORA-TION VALUE | FLAG DATA | CORRECTION DATA AFTER SUPPRESS-ING EXCESSIVE CORRECTION |
|---|---|---|---|---|---|---|
| 0 | 1.986693 | 0 | 0 | | | |
| 0.001 | 2.821082 | 0 | 0 | | | |
| 0.002 | 5.604161 | 0 | 0 | | | |
| 0.003 | 8.311779 | 8.311779 | 4 | 4 | 1 | 4 |
| 0.004 | 10.90755 | 0 | 0 | | | |
| 0.005 | 13.35668 | 0 | 0 | | | |
| 0.006 | 15.62647 | 0 | 0 | | | |
| 0.007 | 17.68677 | 9.37499 | 4 | 8 | 1 | 4 |
| 0.008 | 19.51039 | 0 | 0 | | | |
| ... | | | | | | |
| 0.311 | 6.126888 | 0.69826 | 1 | 0 | 1 | 1 |
| 0.312 | 5.92213 | 0 | 0 | | | |
| 0.312 | 5.561593 | 0 | 0 | | | |
| 0.314 | 5.048477 | 0 | 0 | | | |
| 0.315 | 4.388964 | -1.73792 | -2 | -2 | 1 | -2 |
| 0.316 | 3.592139 | 0 | 0 | | | |
| 0.317 | 2.669853 | 0 | 0 | | | |
| 0.318 | 1.636552 | 0 | 0 | | | |
| 0.319 | 0.509039 | -3.87993 | -4 | -6 | 0 | 0 |

CORRECT (rows at 0.003, 0.007, 0.311, 0.315)

NOT CORRECT BECAUSE OF EXCESSIVE CORRECTION (row at 0.319)

IMAGE FORMING APPARATUS AND CORRECTION DATA GENERATION METHOD WHICH CORRECTS THE INTENSITY OF A LIGHT SOURCE WHICH FORMS A LATENT IMAGE

CROSS-REFERENCE TO RELATED APPLICATIONS

The present application claims priority to and incorporates by reference the entire contents of Japanese Patent Application No. 2015-020535 filed in Japan on Feb. 4, 2015.

BACKGROUND OF THE INVENTION

1. Field of the Invention

The present invention relates to an image forming apparatus and a correction data generation method.

2. Description of the Related Art

In recent years, digital printers employing an electrophotography process have been increasingly used in the field of production printing. Therefore, there is a demand to improve image quality and reliability in the digital printers employing the electrophotography process.

Furthermore, a digital printer employing the electrophotography process includes a photoconductor drum with a surface that functions as a photosensitive scanning surface, a light source that emits laser light, a polygon mirror that deflects the laser light from the light source, and a scanning optical system that guides the laser light deflected by the polygon mirror to the surface (scanning surface) of the photoconductor drum. The digital printer employing the electrophotography process modulates a light flux emitted from the light source in accordance with image data, irradiates the scanning surface with the light flux from the light source, and scans the scanning surface with the light flux, thereby forming an electrostatic latent image corresponding to the image data on the photoconductor drum.

Japanese Laid-open Patent Publication No. 2014-164202 describes a related technique.

Incidentally, if there is eccentricity or a shape error in the photoconductor drum, charging unevenness may occur on the surface of the photoconductor drum. If such charging unevenness occurs, the density of attached toner may vary even when a latent image is formed on the photoconductor drum with a constant intensity. Therefore, the digital printer employing the electrophotography process needs to correct the intensity from the light source in accordance with a position on the surface of the photoconductor drum in order to prevent unevenness of the image density.

In view of the above, there is a need for an image forming apparatus and a correction data generation method capable of correcting the intensity of a light source with accuracy to generate a high-quality image.

SUMMARY OF THE INVENTION

It is an object of the present invention to at least partially solve the problems in the conventional technology.

An image forming apparatus includes: a latent image bearer; a latent image forming unit that includes a light source that emits light with intensity corresponding to image data, and forms a latent image on the latent image bearer with the light from the light source; a correction data generating unit that generates correction data of an intensity of the light source for each position on the latent image bearer; and a correcting unit that corrects the intensity of the light source by a correction amount based on the correction data when the latent image forming unit forms a latent image. The correction data generating unit includes: an acquiring unit that acquires, for each position, a correction value of an intensity of the light source to equalize a density distribution of a latent image; a quantizing unit that generates the correction data for each position by quantizing the correction value for each position; a restoring unit that generates a restored value indicating the correction amount based on the correction data; and an excessive correction suppressing unit that outputs the correction data after reducing an amount of change from an immediately preceding latent image formation position, with respect to a position at which an absolute value of the restored value exceeds an absolute value of the correction value.

A correction data generation method id implemented by an image forming apparatus including: a latent image bearer; a latent image forming unit that includes a light source that emits light with intensity corresponding to image data, and forms a latent image on the latent image bearer with the light from the light source; and a correcting unit that corrects the intensity of the light source by a correction amount based on correction data when the latent image forming unit forms a latent image. The correction data generation method is for generating the correction data of the intensity of the light source for each position on the latent image bearer, and includes: acquiring, by a correction data generating unit, a correction value of the intensity of the light source to equalize a density distribution of a latent image, for each position; generating, by the correction data generating unit, the correction data for each position by quantizing the correction value for each position; generating, by the correction data generating unit, a restored value indicating the correction amount based on the correction data; and outputting, by the correction data generating unit, the correction data after reducing an amount of change from an immediately preceding latent image formation position, with respect to a position at which an absolute value of the restored value exceeds an absolute value of the correction value.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 21 is a diagram illustrating an example of values of correction data quantized with a limitation on the amount of change;

FIG. 23 is a diagram illustrating an example of values of positions, correction values, difference data, correction data quantized with a limitation on the amount of change, restored values, and flag data;

FIG. 24 is a diagram further illustrating an example of values of correction data after suppressing excessive correction.

DETAILED DESCRIPTION OF THE PREFERRED EMBODIMENTS

Figure 1:
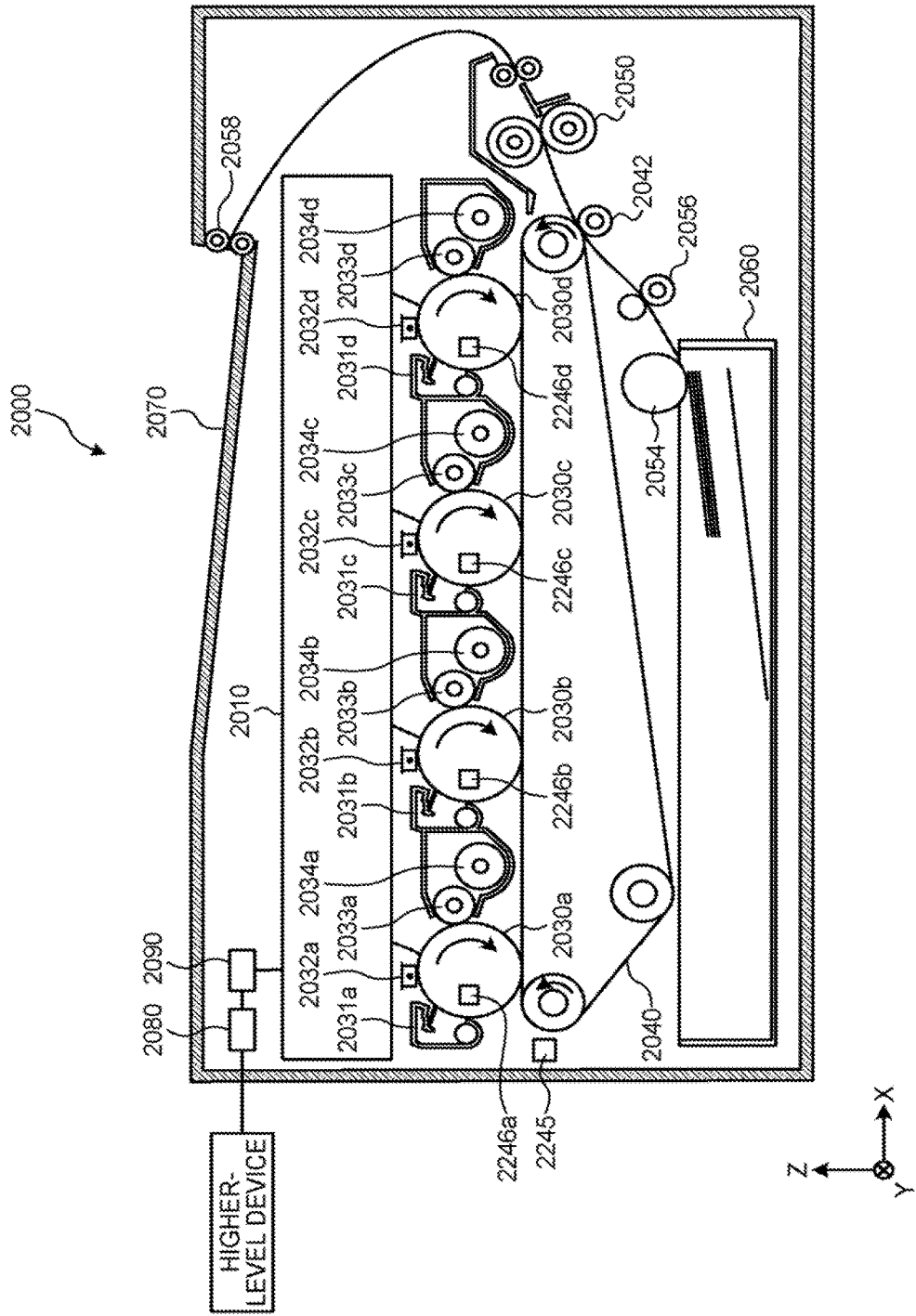
FIG. 1 is a diagram illustrating a schematic configuration of a color printer according to an embodiment.

A color printer 2000 as an example of an image forming apparatus according to an embodiment of the present invention will be described in detail below with reference to the accompanying drawings FIG. 1 is a diagram illustrating a schematic configuration of the color printer 2000 according to the embodiment. The color printer 2000 generates a printed material by transferring toner to a recording paper (recording medium). The color printer 2000 is a multicolor printer of a tandem system that forms a full-color image by superimposing four colors (black, cyan, magenta, and yellow).

The color printer 2000 includes an optical scanning device 2010, four photoconductor drums 2030a, 2030b, 2030c, and 2030d (all four may be collectively referred to as photoconductor drums 2030), four cleaning units 2031a, 2031b, 2031c, and 2031d (all four may be collectively referred to as cleaning units 2031), and four charging devices 2032a, 2032b, 2032c, and 2032d (all four may be collectively referred to as charging devices 2032). The color printer 2000 further includes four developing rollers 2033a, 2033b, 2033c, and 2033d (all four may be collectively referred to as developing rollers 2033), and four toner cartridges 2034a, 2034b, 2034c, and 2034d (all four may be collectively referred to as toner cartridges 2034). The color printer 2000 further includes a transfer belt 2040, a transfer roller 2042, a fixing roller 2050, a paper feeding roller 2054, a registration roller pair 2056, a paper ejection roller 2058, a paper feeding tray 2060, a paper ejection tray 2070, a communication control device 2080, a density detector 2245, four home position sensors 2246a, 2246b, 2246c, and 2246d (all four may be collectively referred to as home position sensors 2246), and a printer control device 2090.

The communication control device 2080 controls bidirectional communication with a higher-level device (for example, a computer) via a network or the like.

The printer control device 2090 integrally controls the components of the color printer 2000. The printer control device 2090 includes a central processing unit (CPU), a read only memory (ROM) that stores therein a program written in a code to be executed by the CPU and various kinds of data used for execution of the program, and a random access memory (RAM) as a work memory. The printer control device 2090 controls the components in response to a request from the higher-level device, and sends image data from the higher-level device to the optical scanning device 2010.

The photoconductor drum 2030a, the charging device 2032a, the developing roller 2033a, the toner cartridge 2034a, and the cleaning unit 2031a are used as a set. These components form an image forming station for forming a black image (also referred to as a K station).

The photoconductor drum 2030b, the charging device 2032b, the developing roller 2033b, the toner cartridge 2034b, and the cleaning unit 2031b are used as a set. These components form an image forming station for forming a cyan image (also referred to as a C station).

The photoconductor drum 2030c, the charging device 2032c, the developing roller 2033c, the toner cartridge 2034c, and the cleaning unit 2031c are used as a set. These components form an image forming station for forming a magenta image (also referred to as an M station).

The photoconductor drum 2030d, the charging device 2032d, the developing roller 2033d, the toner cartridge 2034d, and the cleaning unit 2031d are used as a set. These components form an image forming station for forming a yellow image (also referred to as a Y station).

Each of the photoconductor drums 2030 is an example of a latent image bearer having a photosensitive layer on the surface. That is, the surface of each of the photoconductor drums 2030 serves as a scanning surface. The photoconductor drums 2030a, 2030b, 2030c, and 2030d are arrayed such that the respective rotational axes are parallel to one another, and all of the photoconductor drums rotate in the same direction (for example, in the direction of arrows in a plane in FIG. 1).

In the following explanation, the XYZ three-dimensional Cartesian coordinates system will be used, where the Y-axis direction is a direction parallel to the central axes of the photoconductor drums 2030 and the X-axis direction is a direction along which the photoconductor drums 2030 are arrayed.

Each of the charging devices 2032 uniformly charges the surface of the corresponding photoconductor drum 2030.

The optical scanning device 2010 (a latent image forming unit) includes a light source that emits light with intensity corresponding to the image data, and forms a latent image on each of the photoconductor drums 2030 with the light from the light source. As one example, the optical scanning device 2010 irradiates the charged surface of the corresponding photoconductor drum 2030 with a light flux modulated according to image data of each color (black image data, cyan image data, magenta image data, or yellow image data) based on the image data (the black image data, the cyan image data, the magenta image data, or the yellow image data). Therefore, electric charges are lost in only a portion of the surface of each of the photoconductor drums 2030 irradiated with the light, and a latent image corresponding to the image data is formed on the surface. The latent images formed by the optical scanning device 2010 move in a direction toward the corresponding developing rollers 2033 along with the rotation of the photoconductor drums 2030. The configuration of the optical scanning device 2010 will be described in detail later.

The toner cartridge 2034a contains black toner. The black toner is supplied to the developing roller 2033a. The toner cartridge 2034b contains cyan toner. The cyan toner is supplied to the developing roller 2033b. The toner cartridge 2034c contains magenta toner. The magenta toner is supplied to the developing roller 2033c. The toner cartridge 2034d contains yellow toner. The yellow toner is supplied to the developing roller 2033d.

On the surface of each of the developing rollers 2033, toner provided from the corresponding toner cartridge 2034 is uniformly and thinly applied along with the rotation. The toner on the surface of each of the developing rollers 2033 comes in contact with the surface of the corresponding photoconductor drum 2030, and is transferred and adheres to only the portion of the surface irradiated with the light. That is, each of the developing rollers 2033 attaches the toner to the latent image formed on the surface of the corresponding photoconductor drum 2030 to visualize the image.

The transfer belt 2040 is wound around a belt rotation mechanism, and rotates in one direction. An outer surface of the transfer belt 2040 comes in contact with the surfaces of each of the photoconductor drums 2030a, 2030b, 2030c, and 2030d in a position opposite to the optical scanning device 2010. The outer surface of the transfer belt 2040 also comes in contact with the transfer roller 2042.

An image formed with the toner attached thereto (toner image) on the surface of each of the photoconductor drums 2030 moves in a direction toward the transfer belt 2040 along with the rotation of the photoconductor drums 2030. The toner images of yellow, magenta, cyan, and black are sequentially transferred to the transfer belt 2040 at predetermined timings in a superimposed manner, so that a color image is formed. The color image formed on the transfer belt 2040 moves in a direction toward the transfer roller 2042 along with the movement of the transfer belt 2040.

The paper feeding tray 2060 stores therein recording paper. The paper feeding roller 2054 is disposed near the paper feeding tray 2060. The paper feeding roller 2054 picks out sheets of recording paper one by one from the paper feeding tray 2060, and conveys each sheet of recording paper to the registration roller pair 2056.

The registration roller pair 2056 feeds the recording paper to a gap between the transfer belt 2040 and the transfer roller 2042 at a predetermined timing. Therefore, the color image on the transfer belt 2040 is transferred to the recording paper. The recording paper subjected to the transfer is conveyed to the fixing roller 2050.

The fixing roller 2050 applies heat and pressure to the recording paper. Thereby, the fixing roller 2050 can fix the toner to the recording paper. The recording paper with the fixed toner is conveyed to the paper ejection tray 2070 through the paper ejection roller 2058, and sequentially stacked on the paper ejection tray 2070.

Each of the cleaning units 2031 removes toner (residual toner) remaining on the surface of the corresponding photoconductor drum 2030. The surface of the photoconductor drum 2030 from which the residual toner is removed returns to the position facing the corresponding charging device 2032.

In the transfer belt 2040 and the photoconductor drum 2030, a region in which an image is formed will be referred to as an "effective image region". Furthermore, in the image formed on the transfer belt 2040 and the photoconductor drum 2030, the moving direction of the transfer belt 2040 and the moving direction of the photoconductor drum 2030 will be referred to as the "sub-scanning direction", and the width direction of the transfer belt 2040 and the axial direction of the photoconductor drum 2030 will be referred to as the "main-scanning direction".

Figure 2:
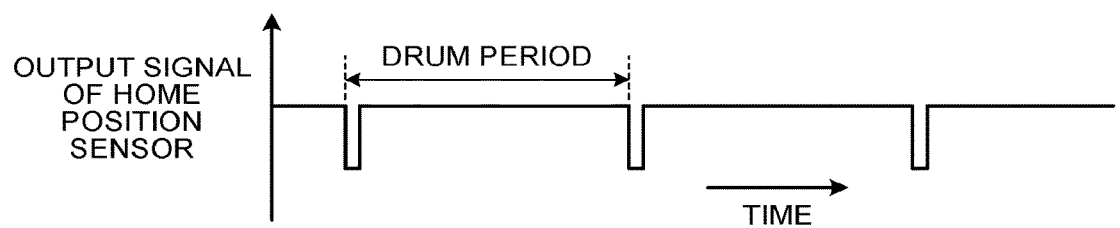
FIG. 2 is a diagram illustrating an output signal of a home position sensor.

FIG. 2 is a diagram illustrating an output signal of the home position sensors 2246. Each of the home position sensors 2246 detects a home position for rotation of the corresponding photoconductor drum 2030. Each of the home position sensors 2246 generates a pulse indicating a timing at which the photoconductor drum 2030 reaches a rotation position as the home position with a rotation period (drum period) of the corresponding photoconductor drum 2030.

Specifically, the home position sensor 2246a detects a home position of rotation of the photoconductor drum 2030a. The home position sensor 2246b detects a home position of rotation of the photoconductor drum 2030b. The home position sensor 2246c detects a home position of rotation of the photoconductor drum 2030c. The home position sensor 2246d detects a home position of rotation of the photoconductor drum 2030d.

Figure 3:
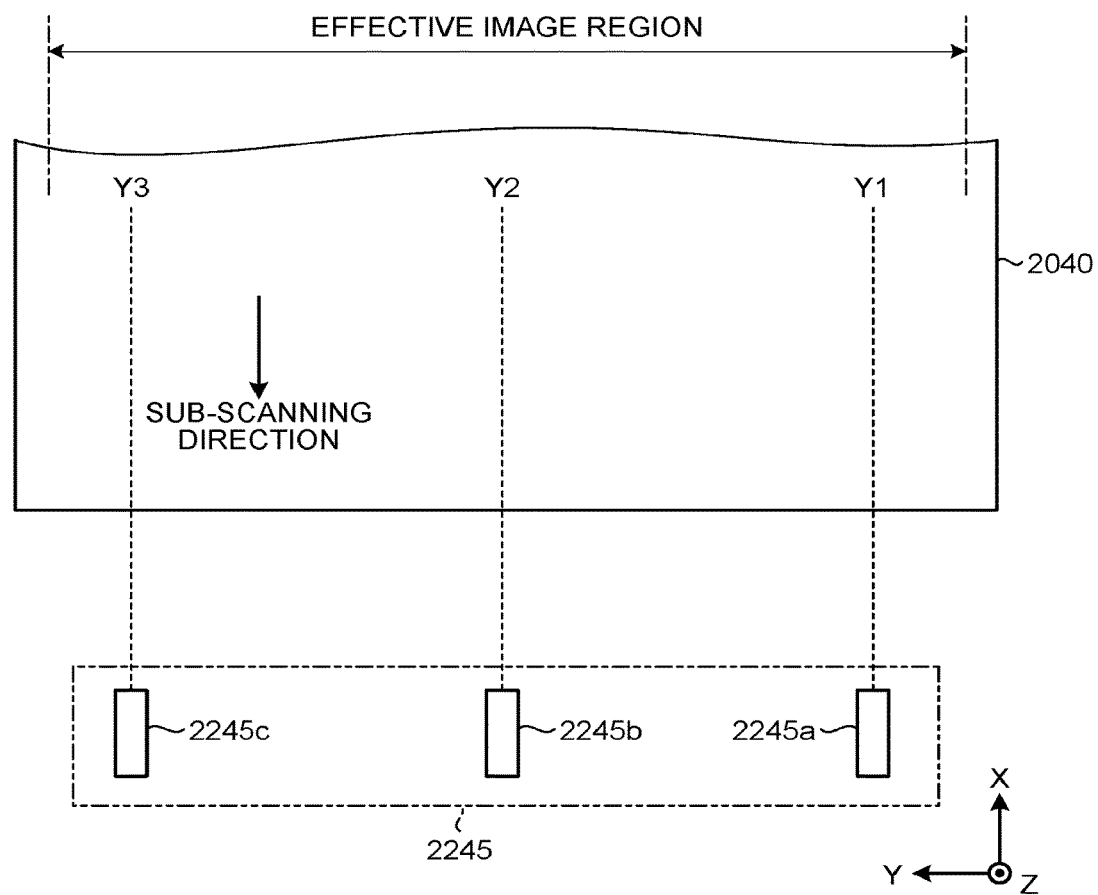
FIG. 3 is a diagram illustrating an example of arrangement of optical sensors included in a density detector.

FIG. 3 is a diagram illustrating an example of arrangement of optical sensors 2245a, 2245b, and 2245c included in the density detector 2245. The density detector 2245 detects a toner density of an image formed on the transfer belt 2040. The density detector 2245 is disposed in the negative X direction from the transfer belt 2040 (a position upstream of the fixing roller 2050 and downstream of the four photoconductor drums 2030 in the moving direction of the transfer belt 2040).

As one example, the density detector 2245 includes the three optical sensors 2245a, 2245b, and 2245c as illustrated in FIG. 3. The optical sensor 2245a is disposed so as to face the vicinity of the edge in the negative Y direction (near one end of the transfer belt 2040 in the width direction) in the effective image region of the transfer belt 2040. The optical sensor 2245c is disposed so as to face the vicinity of the edge in the positive Y direction (near the other end of the transfer belt 2040 in the width direction) in the effective image region of the transfer belt 2040. The optical sensor 2245b is disposed approximately in the middle position between the optical sensor 2245a and the optical sensor 2245c in the main-scanning direction (the middle position in the width direction of the transfer belt 2040). Here, the center position of the optical sensor 2245a is denoted by Y1, the center position of the optical sensor 2245b is denoted by Y2, and the center position of the optical sensor 2245c is denoted by Y3 in the main-scanning direction (the Y-axis direction).

Figure 4:
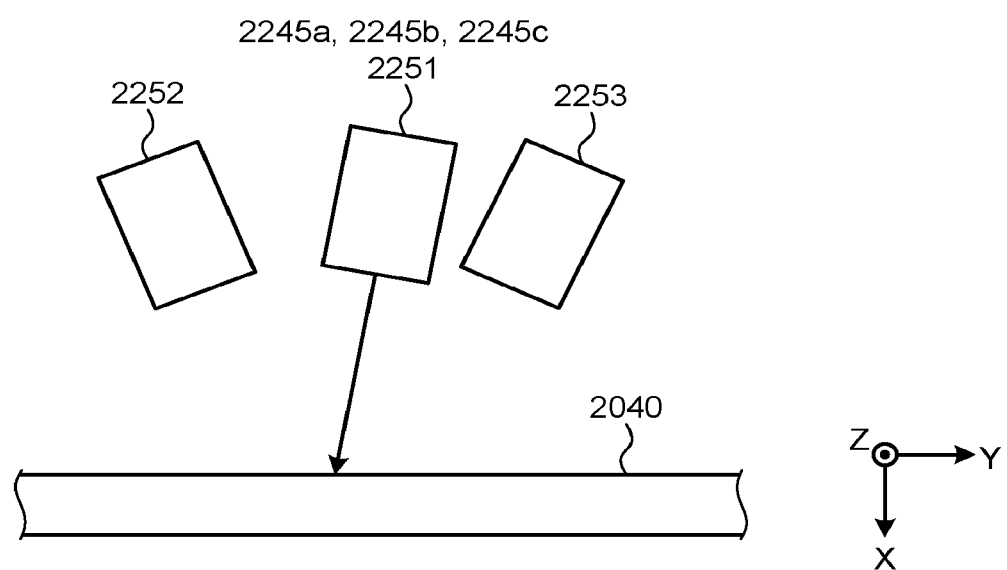
FIG. 4 is a diagram illustrating a configuration of the optical sensors.

FIG. 4 is a diagram illustrating a configuration of the optical sensors 2245a, 2245b, and 2245c. As illustrated in FIG. 4, each of the optical sensors 2245a, 2245b, and 2245c includes, as one example, a light emitting diode (LED) 2251 that emits light (hereinafter, also referred to as detection light) toward the transfer belt 2040, a specularly-reflected light receiving element 2252 that receives specularly-reflected light from the transfer belt 2040 or a toner patch on the transfer belt 2040, and a diffusely-reflected light receiving element 2253 that receives diffusely-reflected light from the transfer belt 2040 or the toner patch on the transfer belt 2040. Each of the light receiving elements outputs a signal (photoelectric conversion signal) corresponding to the amount of received light. The optical sensors 2245a, 2245b, and 2245c as described above are controlled by the optical scanning device 2010.

Figure 5:
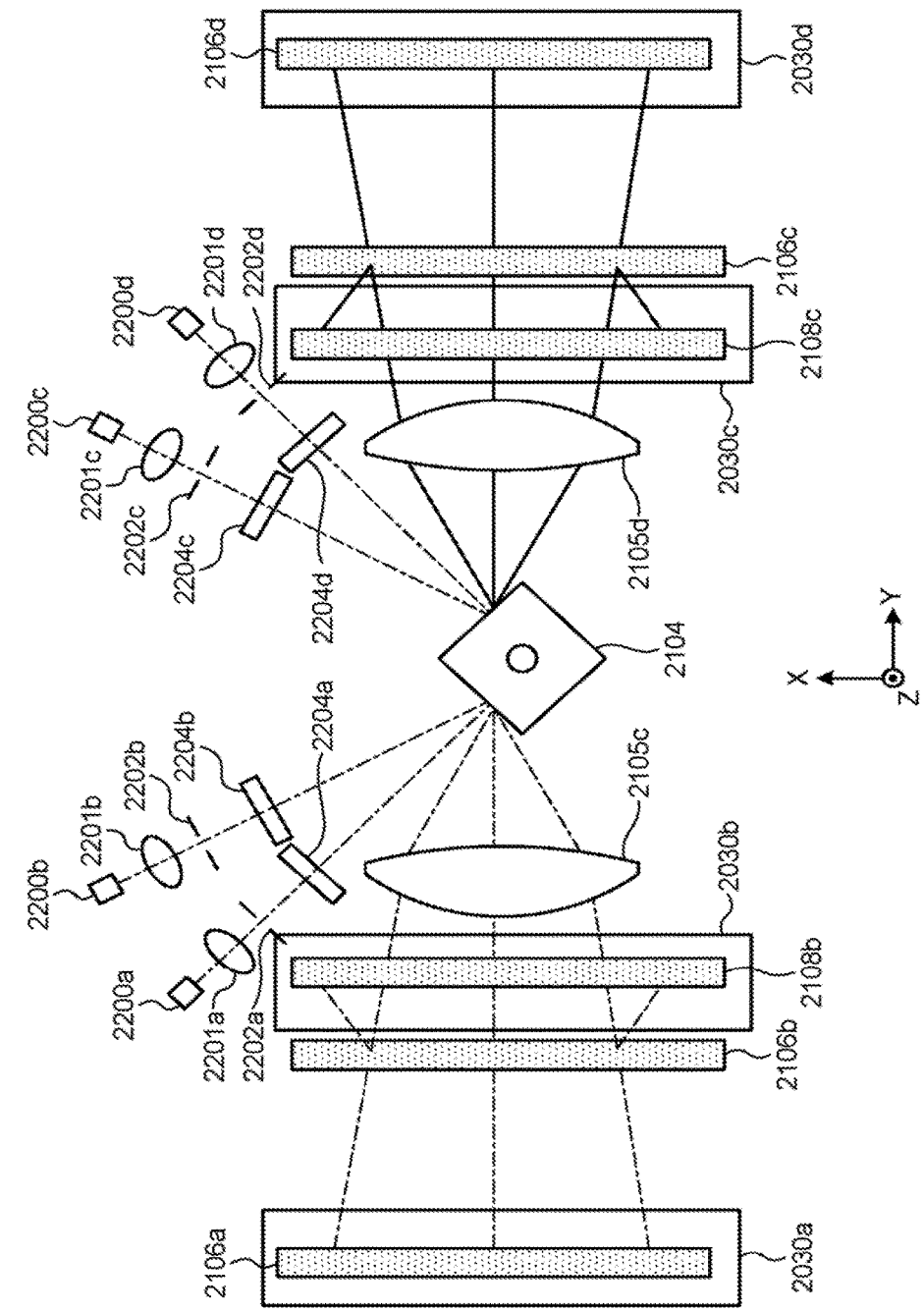
FIG. 5 is a diagram illustrating a configuration of an optical system of an optical scanning device.
Figure 6:
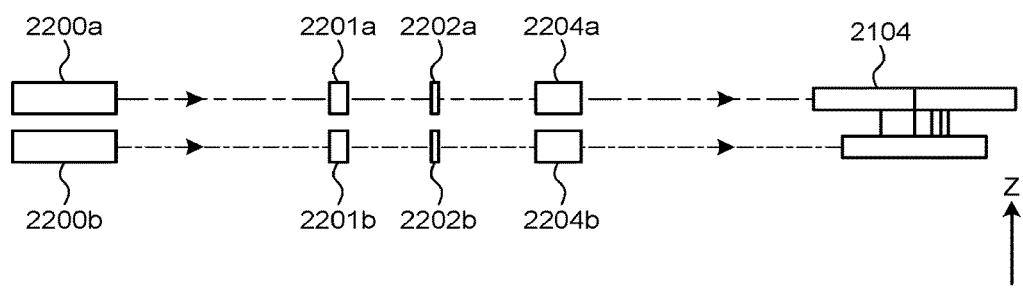
FIG. 6 is a diagram illustrating an example of an optical path from a light source to a polygon mirror viewed from a first direction.
Figure 7:
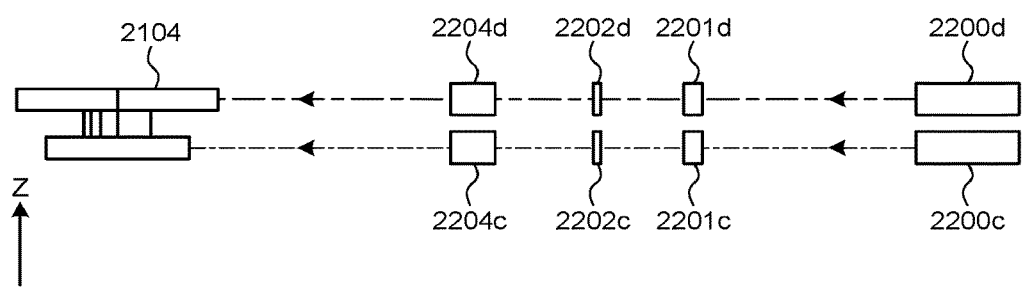
FIG. 7 is a diagram illustrating an example of the optical path from the light source to the polygon mirror viewed from a second direction.
Figure 8:
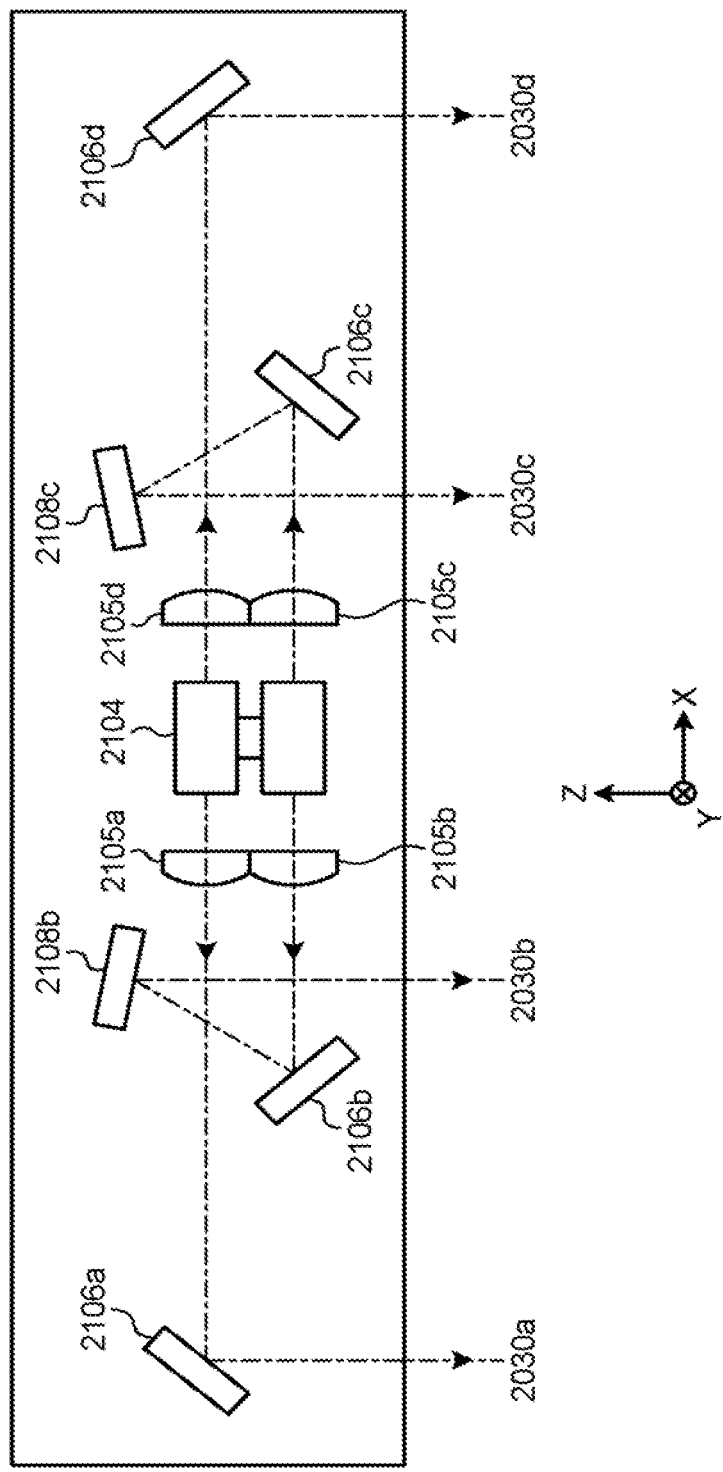
FIG. 8 is a diagram illustrating an example of optical paths from the polygon mirror to photoconductor drums.

FIG. 5 is a diagram illustrating a configuration of an optical system of the optical scanning device 2010. FIG. 6 is a diagram illustrating an example of an optical path from a light source 2200a to a polygon mirror 2104 and an optical path from a light source 2200b to the polygon mirror 2104. FIG. 7 is a diagram illustrating an example of an optical path from a light source 2200c to the polygon mirror 2104, and an optical path from a light source 2200d to the polygon mirror 2104. FIG. 8 is a diagram illustrating an example of optical paths from the polygon mirror 2104 to the photoconductor drums 2030.

The configuration of the optical system of the optical scanning device 2010 will be described below. The optical scanning device 2010 includes, as the optical system, the four light sources 2200a, 2200b, 2200c, and 2200d (all four may be collectively referred to as light sources 2200), four coupling lenses 2201a, 2201b, 2201c, and 2201d, four aperture plates 2202a, 2202b, 2202c, and 2202d, and four cylindrical lenses 2204a, 2204b, 2204c, and 2204d. The optical scanning device 2010 further includes, as the optical system, the polygon mirror 2104, four scanning lenses 2105a, 2105b, 2105c, and 2105d, and six reflecting mirrors 2106a, 2106b, 2106c, 2106d, 2108b, and 2108c. These components are assembled at predetermined positions in an optical housing.

The optical scanning device 2010 also includes circuitry of an electrical system. The circuitry of the electrical system will be described later with reference to FIG. 9 and the subsequent drawings.

Each of the light sources 2200a, 2200b, 2200c, and 2200d includes a surface-emitting laser array, in which a plurality of light-emitting units are two-dimensionally arrayed. The light-emitting units of the surface-emitting laser array are arranged such that light emitting units are evenly spaced when all of the light-emitting units are orthogonally projected on an imaginary line extending in the direction corresponding to the sub-scanning direction. Each of the light sources 2200a, 2200b, 2200c, and 2200d is, for example, a vertical-cavity surface-emitting laser (VCSEL).

The coupling lens 2201a is disposed on the optical path of a light flux emitted from the light source 2200a, and makes the light flux passing therethrough into an approximately parallel light flux. The coupling lens 2201b is disposed on the optical path of a light flux emitted from the light source 2200b, and makes the light flux passing therethrough into an approximately parallel light flux. The coupling lens 2201c is disposed on the optical path of a light flux emitted from the light source 2200c, and makes the light flux passing therethrough into an approximately parallel light flux. The coupling lens 2201d is disposed on the optical path of a light flux emitted from the light source 2200d, and makes the light flux passing therethrough into an approximately parallel light flux.

The aperture plate 2202a includes an aperture, and shapes the light flux coming through the coupling lens 2201a. The aperture plate 2202b includes an aperture, and shapes the light flux coming through the coupling lens 2201b. The aperture plate 2202c includes an aperture, and shapes the light flux coming through the coupling lens 2201c. The aperture plate 2202d includes an aperture, and shapes the light flux coming through the coupling lens 2201d.

The cylindrical lens 2204a focuses the light flux passing through the aperture of the aperture plate 2202a, on the vicinity of a deflection/reflection surface of the polygon mirror 2104 in the Z-axis direction. The cylindrical lens 2204b focuses the light flux passing through the aperture of the aperture plate 2202b, on the vicinity of a deflection/reflection surface of the polygon mirror 2104 in the Z-axis direction. The cylindrical lens 2204c focuses the light flux passing through the aperture of the aperture plate 2202c, on the vicinity of a deflection/reflection surface of the polygon mirror 2104 in the Z-axis direction. The cylindrical lens 2204d focuses the light flux passing through the aperture of the aperture plate 2202d, on the vicinity of a deflection/reflection surface of the polygon mirror 2104 in the Z-axis direction.

The optical system including the coupling lens 2201a, the aperture plate 2202a, and the cylindrical lens 2204a is a pre-deflector optical system of the K station. The optical system including the coupling lens 2201b, the aperture plate 2202b, and the cylindrical lens 2204b is a pre-deflector optical system of the C station. The optical system including the coupling lens 2201c, the aperture plate 2202c, and the cylindrical lens 2204c is a pre-deflector optical system of the M station. The optical system including the coupling lens 2201d, the aperture plate 2202d, and the cylindrical lens 2204d is a pre-deflector optical system of the Y station.

The polygon mirror 2104 includes two stages of four-sided mirrors that rotate around an axis parallel to the Z-axis, and each mirror serves as a deflection/reflection surface. The mirrors are arranged such that the light flux from the cylindrical lens 2204b and the light flux from the cylindrical lens 2204c are deflected by the four-sided mirror in the first stage (lower stage), and the light flux from the cylindrical lens 2204a and the light flux from the cylindrical lens 2204d are deflected by the four-sided mirror in the second stage (upper stage).

The light flux from the cylindrical lens 2204a and the light flux from the cylindrical lens 2204b are deflected in the negative X direction from the polygon mirror 2104, and the light flux from the cylindrical lens 2204c and the light flux from the cylindrical lens 2204d are deflected in the positive X direction from the polygon mirror 2104.

Each of the scanning lenses 2105a, 2105b, 2105c, and 2105d has optical power for condensing the light flux onto a point near the corresponding photoconductor drum 2030, and has optical power for moving an optical spot, along with the rotation of the polygon mirror 2104, in the main-scanning direction at a constant speed on the surface of the corresponding photoconductor drum 2030.

The scanning lens 2105a and the scanning lens 2105b are disposed in the negative X direction from the polygon mirror 2104. The scanning lens 2105c and the scanning lens 2105d are disposed in the positive X direction from the polygon mirror 2104.

The scanning lens 2105a and the scanning lens 2105b are laminated in the Z-axis direction. The scanning lens 2105b faces the four-sided mirror in the first stage. The scanning lens 2105a faces the four-sided mirror in the second stage.

The scanning lens 2105c and the scanning lens 2105d are laminated in the Z-axis direction. The scanning lens 2105c faces the four-sided mirror in the first stage. The scanning lens 2105d faces the four-sided mirror in the second stage.

The light flux from the cylindrical lens 2204a is deflected by the polygon mirror 2104, and emitted to the photoconductor drum 2030a via the scanning lens 2105a and the reflecting mirror 2106a to form an optical spot. The optical spot moves in the longitudinal direction of the photoconductor drum 2030a along with the rotation of the polygon mirror 2104. That is, the photoconductor drum 2030a is scanned with the optical spot. The moving direction of the optical spot at this time is the "main-scanning direction" of the photoconductor drum 2030a, and the rotation direction of the photoconductor drum 2030a at this time is the "sub-scanning direction" of the photoconductor drum 2030a.

The light flux from the cylindrical lens 2204b is deflected by the polygon mirror 2104, and emitted to the photoconductor drum 2030b via the scanning lens 2105b, the reflecting mirror 2106b, and the reflecting mirror 2108b to form an optical spot. The optical spot moves in the longitudinal direction of the photoconductor drum 2030b along with the rotation of the polygon mirror 2104. That is, the photoconductor drum 2030b is scanned with the optical spot. The moving direction of the optical spot at this time is the "main-scanning direction" of the photoconductor drum 2030b, and the rotation direction of the photoconductor drum 2030b at this time is the "sub-scanning direction" of the photoconductor drum 2030b.

The light flux from the cylindrical lens 2204c is deflected by the polygon mirror 2104, and emitted to the photoconductor drum 2030c via the scanning lens 2105c, the reflecting mirror 2106c, and the reflecting mirror 2108c to form an optical spot. The optical spot moves in the longitudinal direction of the photoconductor drum 2030c along with the rotation of the polygon mirror 2104. That is, the photoconductor drum 2030c is scanned with the optical spot. The moving direction of the optical spot at this time is the "main-scanning direction" of the photoconductor drum 2030c, and the rotation direction of the photoconductor drum 2030c at this time is the "sub-scanning direction" of the photoconductor drum 2030c.

The light flux from the cylindrical lens 2204d is deflected by the polygon mirror 2104, and emitted to the photoconductor drum 2030d via the scanning lens 2105d and the reflecting mirror 2106d to form an optical spot. The optical spot moves in the longitudinal direction of the photoconductor drum 2030d along with the rotation of the polygon mirror 2104. That is, the photoconductor drum 2030d is scanned with the optical spot. The moving direction of the optical spot at this time is the "main-scanning direction" of the photoconductor drum 2030d, and the rotation direction of the photoconductor drum 2030d at this time is the "sub-scanning direction" of the photoconductor drum 2030d.

Each of the reflecting mirrors 2106a, 2106b, 2106c, 2106d, 2108b, and 2108c is disposed such that the optical path lengths from the polygon mirror 2104 to the photoconductor drums 2030 are equal to one another and such that the incidence positions and the incidence angles of the light fluxes with respect to the photoconductor drums 2030 are each equal to one another.

The optical system disposed on the optical path between the polygon mirror 2104 and each of the photoconductor drums 2030 is also referred to as a scanning optical system. Here, the scanning optical system of the K station includes the scanning lens 2105a and the reflecting mirror 2106a. The scanning optical system of the C station includes the scanning lens 2105b and the two reflecting mirrors 2106b and 2108b. The scanning optical system of the M station includes the scanning lens 2105c and the two reflecting mirrors 2106c and 2108c. The scanning optical system of the Y station includes the scanning lens 2105d and the reflecting mirror 2106d. In each of the scanning optical systems, the scanning lens 2105 may include a plurality of lenses.

Figure 9:
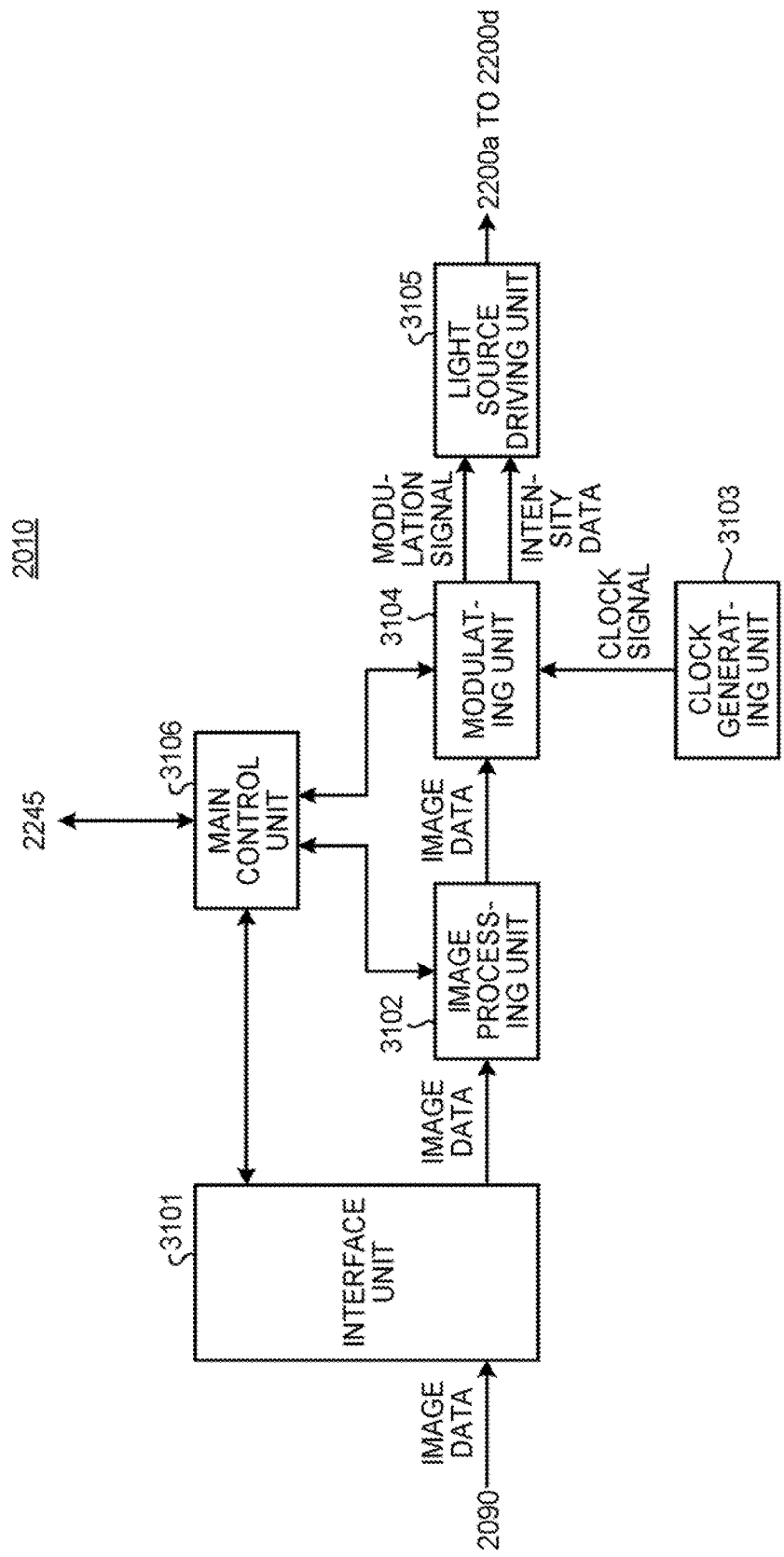
FIG. 9 is a diagram illustrating a configuration of an electrical system of the optical scanning device.

FIG. 9 is a diagram illustrating a configuration of the electrical system of the optical scanning device 2010. The optical scanning device 2010 includes, as the configuration of the electrical system, an interface (IF) unit 3101, an image processing unit 3102, a clock generating unit 3103, a modulating unit 3104, a light source driving unit 3105, and a main control unit 3106.

The IF unit 3101 acquires, from the printer control device 2090, image data transferred from a higher-level device (for example, a computer). The IF unit 3101 sends the acquired image data to the image processing unit 3102 in the subsequent stage. Furthermore, the IF unit 3101 sends a control command or the like acquired from the printer control device 2090 to the main control unit 3106.

The image processing unit 3102 acquires image data from the IF unit 3101, and converts the image data to color image data corresponding to a printing method. As one example, the image processing unit 3102 converts image data in the RGB format into image data in the tandem format (CMYK format). Furthermore, the image processing unit 3102 performs gamma correction, pseudo halftone processing, and the like. As one example, the image processing unit 3102 sends 1-bit image data in the tandem format to the modulating unit 3104.

The clock generating unit 3103 generates a clock signal indicating a light emission timing for a pixel. The modulating unit 3104 receives the image data in the tandem format from the image processing unit 3102. The modulating unit 3104 modulates the acquired image data in the tandem format into a clock signal for each color to generate a modulation signal for each color. The modulating unit 3104 generates intensity data indicating the intensity of the light source 2200 according to a light irradiation position on the surface of the photoconductor drum 2030. The modulating unit 3104 sends the generated modulation signal and the generated intensity data to the light source driving unit 3105.

The light source driving unit 3105 receives the modulation signal and the intensity data corresponding to the image data. The light source driving unit 3105 drives the corresponding light source 2200a, 2200b, 2200c, or 2200d according to the modulation signal for each color output from the modulating unit 3104. Furthermore, the light source driving unit 3105 changes the amount of electrical current for emitting light from the corresponding light source 2200a, 2200b, 2200c, or 2200d, in accordance with the intensity data output from the modulating unit 3104. Therefore, the light source driving unit 3105 can cause each of the light sources 2200a, 2200b, 2200c, and 2200d to emit light with an intensity indicated by the intensity data, at a timing corresponding to the modulation signal.

The main control unit 3106 controls the entire optical scanning device 2010. The main control unit 3106 can cause the light sources 2200a, 2200b, 2200c, and 2200d to emit light corresponding to the image data to form latent images on the photoconductor drums 2030a, 2030b, 2030c, and 2030d.

Figure 10:
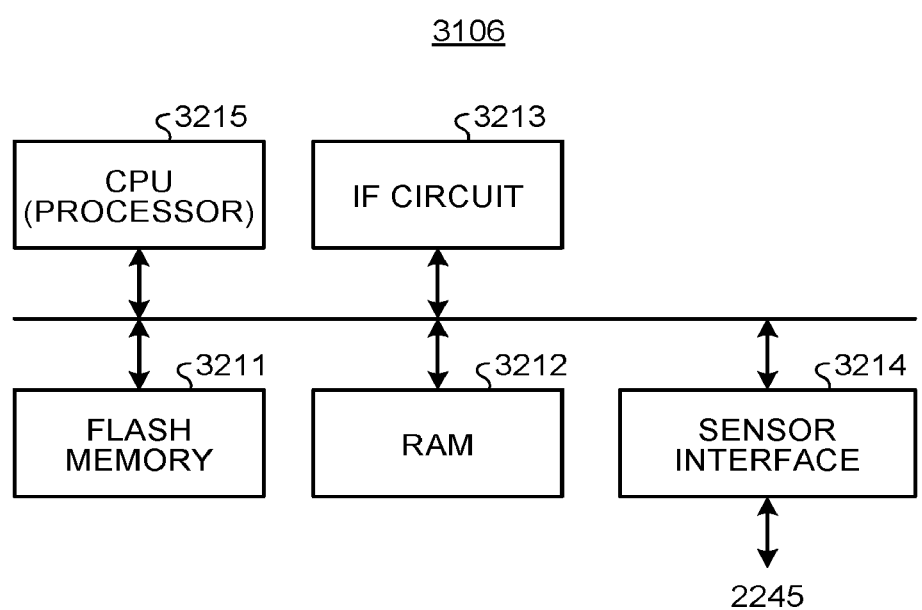
FIG. 10 is a diagram illustrating an example of a configuration of a main control unit.

FIG. 10 is a diagram illustrating an example of a configuration of the main control unit 3106. As one example, main control unit 3106 includes a flash memory 3211, a RAM 3212, an IF circuit 3213, a sensor interface 3214, and a CPU 3215 (processor). The flash memory 3211, the RAM 3212, the IF circuit 3213, the sensor interface 3214, and the CPU 3215 are connected to one another via a bus.

The flash memory 3211 stores therein a program executed by the CPU 3215 and various kinds of data necessary for execution of the program by the CPU 3215. The RAM 3212 is a storage area serving as a work area when the CPU 3215 executes the program. The IF circuit 3213 exchanges data with each of circuits of the optical scanning device 2010.

The sensor interface 3214 controls the density detector 2245 under the control of the CPU 3215. More specifically, the sensor interface 3214 drives the LED 2251 of each of the optical sensors 2245a, 2245b, and 2245c in the density detector 2245, and performs analog-to-digital (AD) conversion on output signals from the specularly-reflected light receiving element 2252 and the diffusely-reflected light receiving element 2253 to obtain the signals.

The CPU 3215 operates in accordance with the program stored in the flash memory 3211, and controls the entire optical scanning device 2010. As one example, the CPU 3215 outputs predetermined image data from the image processing unit 3102 and forms a density variation measurement image on the transfer belt 2040. Furthermore, as one example, the CPU 3215 controls the density detector 2245 and acquires a toner density of the density variation measurement image formed as described above. Then, the main control unit 3106 generates, from the acquired toner density, correction data for correcting the intensity of the light source 2200 according to a light irradiation position on the surface of the photoconductor drum 2030, and sends the correction data to the modulating unit 3104.

Figure 11:
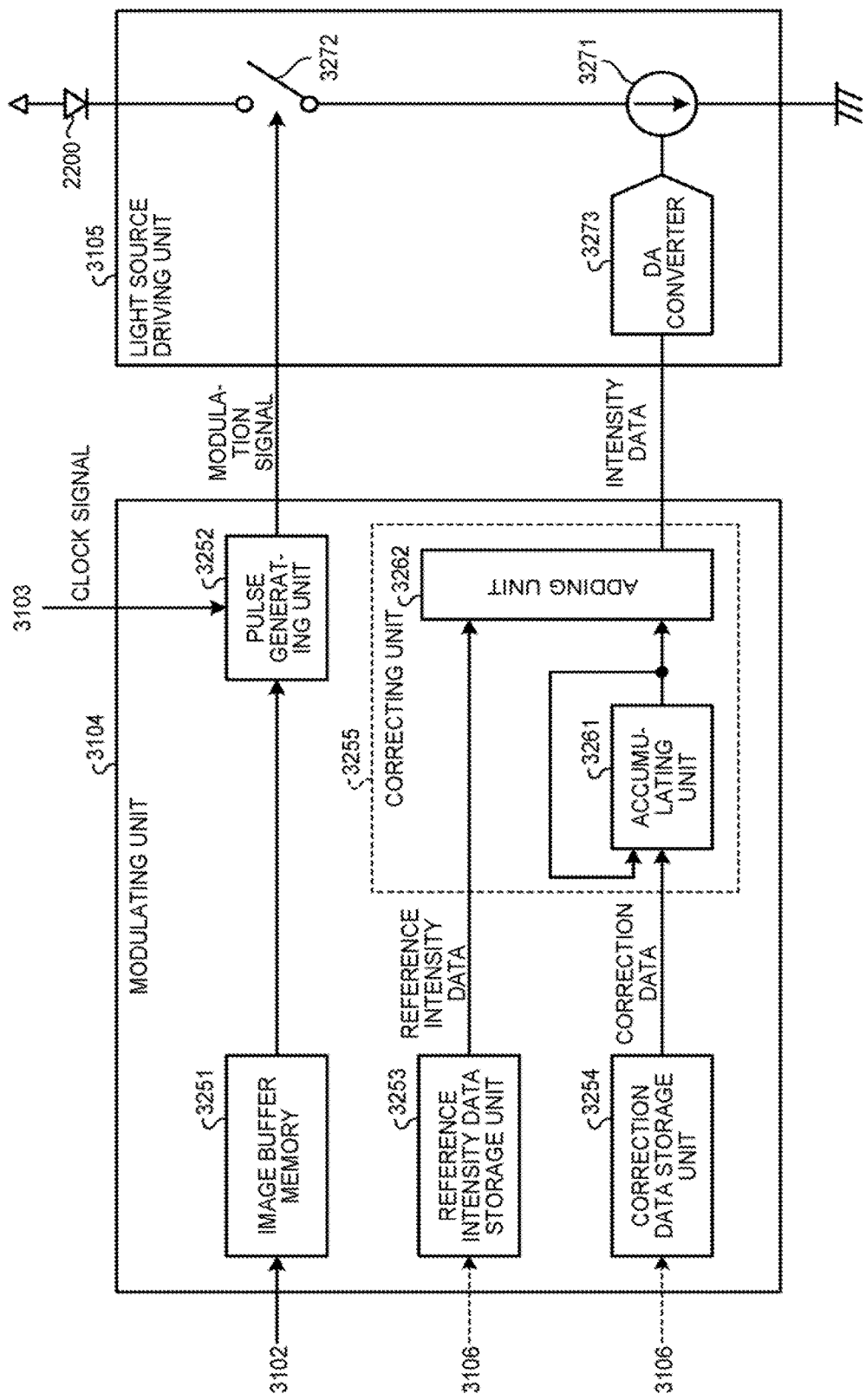
FIG. 11 is a diagram illustrating configurations of a modulating unit and a light source driving unit.

FIG. 11 is a diagram illustrating configurations of the modulating unit 3104 and the light source driving unit 3105. The modulating unit 3104 includes an image buffer memory 3251, a pulse generating unit 3252, a reference intensity data storage unit 3253, a correction data storage unit 3254, and a correcting unit 3255.

The image buffer memory 3251 accumulates image data sent from the image processing unit 3102. The image buffer memory 3251 sends image data to the pulse generating unit 3252 for each pixel at a timing at which the pulse generating unit 3252 in the subsequent stage writes the image data.

The pulse generating unit 3252 receives the image data output from the image buffer memory 3251 for each pixel. The pulse generating unit 3252 modulates the clock signal by the received image data, and generates a modulation signal indicating a lighting timing of the light source 2200 for each of the light sources 2200. The pulse generating unit 3252 sends the generated modulation signal for each of the light sources 2200 to the light source driving unit 3105.

The reference intensity data storage unit 3253 stores therein reference intensity data indicating the reference intensity of light emitted from the light source 2200. The reference intensity data storage unit 3253 receives the reference intensity data from the main control unit 3106 and stores the reference intensity data in advance.

The correction data storage unit 3254 stores therein correction data for correcting the reference intensity data. More specifically, the correction data storage unit 3254 stores therein correction data for each position in the main-scanning direction and the sub-scanning direction on the photoconductor drum 2030. Furthermore, in the embodiment, the correction data storage unit 3254 stores therein correction data indicating a difference from a correction amount at an immediately preceding latent image formation position.

The reference intensity data storage unit 3253 and the correction data storage unit 3254 are non-volatile, and retain stored information even when power is disconnected. Therefore, the correction data storage unit 3254 needs not acquire and store the correction data every time the power is disconnected.

When the optical scanning device 2010 forms a latent image, the correcting unit 3255 reads correction data corresponding to a latent image formation position from the correction data storage unit 3254, and corrects the reference intensity data indicating the intensity of the light source 2200. Specifically, the correcting unit 3255 reads the correction data and corrects the reference intensity data for each of the positions in the main-scanning direction and the sub-scanning direction on the photoconductor drum 2030. Then, the correcting unit 3255 sends the corrected intensity data to the light source driving unit 3105.

In the embodiment, the correcting unit 3255 generates a correction amount by adding correction data at a current latent image formation position to the correction amount at the immediately preceding latent image formation position. In other words, the correcting unit 3255 generates the correction amount by accumulating pieces of correction data. As one example, the correcting unit 3255 includes an accumulating unit 3261 and an adding unit 3262. The accumulating unit 3261 reads a piece of correction data for each position, and accumulates the pieces of the read correction data to generate a correction amount. The adding unit 3262 adds the correction amount, which is obtained by the accumulating unit 3261 by accumulating the pieces of the correction data, to the reference intensity data stored in the reference intensity data storage unit 3253. Then, the adding unit 3262 sends a result of addition, as the intensity data, to the light source driving unit 3105.

The light source driving unit 3105 includes a current source 3271, a lighting switch 3272, and a digital-to-analog (DA) converter 3273.

The current source 3271 applies an electrical current set by the DA converter 3273 to the corresponding light source 2200. The lighting switch 3272 switches whether to apply an electrical current to the light source 2200 at a timing of a modulation signal received from the modulating unit 3104. Specifically, the lighting switch 3272 causes the current source 3271 to apply an electrical current to the light source 2200 at a timing at which a pulse of the modulation signal occurs. Therefore, the lighting switch 3272 can cause the light source 2200 to emit light at the timing of the pulse of the modulation signal (at a timing to form a latent image).

The DA converter 3273 receives the intensity data from the modulating unit 3104. In this example, the DA converter 3273 has 9-bit resolution and receives 9-bit intensity data. Then, the DA converter 3273 performs DA conversion on the received intensity data, and provides an analog electrical current signal to the current source 3271.

The current source 3271 applies, to the light source 2200, an electrical current proportional to the amount of current provided by the DA converter 3273. Therefore, the DA converter 3273 can control the intensity of the light source 2200 in accordance with the intensity data.

As described above, the light source driving unit 3105 can cause the light source 2200 to emit light by the modulation signal that is generated by the modulating unit 3104 and that corresponds to the image data. Accordingly, the light source driving unit 3105 can control the intensity of the light source 2200 in accordance with the intensity data generated by the modulating unit 3104.

Figure 12:
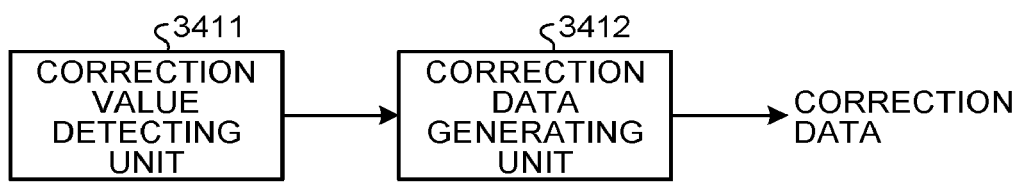
FIG. 12 is a diagram illustrating a functional configuration of the main control unit to generate correction data.

FIG. 12 is a diagram illustrating a functional configuration of the main control unit 3106 for generating the correction data. Even if a latent image is formed on the photoconductor drum 2030 with a constant intensity, density unevenness of attached toner occurs. The main control unit 3106 generates correction data so as to cancel out the density unevenness, and sends the correction data to the modulating unit 3104. The main control unit 3106 performs a correction data generation process at a predetermined timing. As one example, the main control unit 3106 updates the correction data at the time of shipment from a factory or at the time of maintenance of the color printer 2000. Furthermore, as one example, the main control unit 3106 updates the correction data when the mechanical configurations of the photoconductor drum 2030, the transfer belt 2040, and the optical scanning device 2010 are adjusted.

As illustrated in FIG. 12, the main control unit 3106 includes a correction value detecting unit 3411 and a correction data generating unit 3412. The main control unit 3106 implements the correction value detecting unit 3411 and the correction data generating unit 3412 by executing a predetermined program.

The correction value detecting unit 3411 detects a correction value of the intensity of the light source 2200 to equalize a density distribution of a latent image, for each position on the surface of the photoconductor drum 2030. The correction data generating unit 3412 generates correction data of the intensity of the light source 2200 based on the correction value detected by the correction value detecting unit 3411, for each position on the surface of the photoconductor drum 2030. The detailed configuration of the correction data generating unit 3412 will be described later with reference to FIG. 17.

Figure 13:
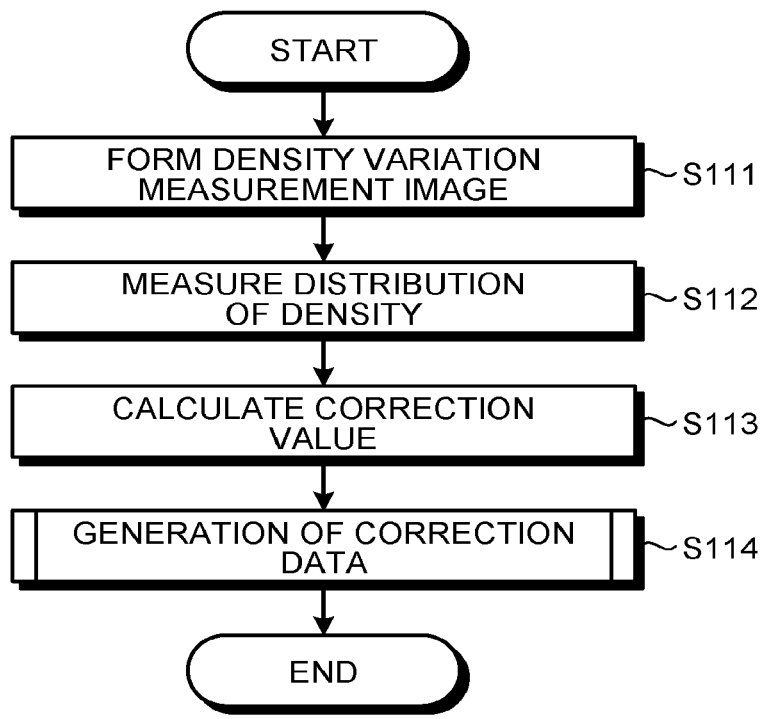
FIG. 13 is a flowchart illustrating the flow of a process of generating the correction data.

FIG. 13 is a flowchart illustrating the flow of the process for generating the correction data. The main control unit 3106 generates the correction data according to the flow illustrated in FIG. 13.

Incidentally, the main control unit 3106 stores therein a table indicating a correspondence relation between an output signal of the density detector 2245 and a toner density. Furthermore, the main control unit 3106 stores therein a table indicating a correspondence relation between the toner density and the intensity data indicating the intensity of the light source 2200.

Figure 14:
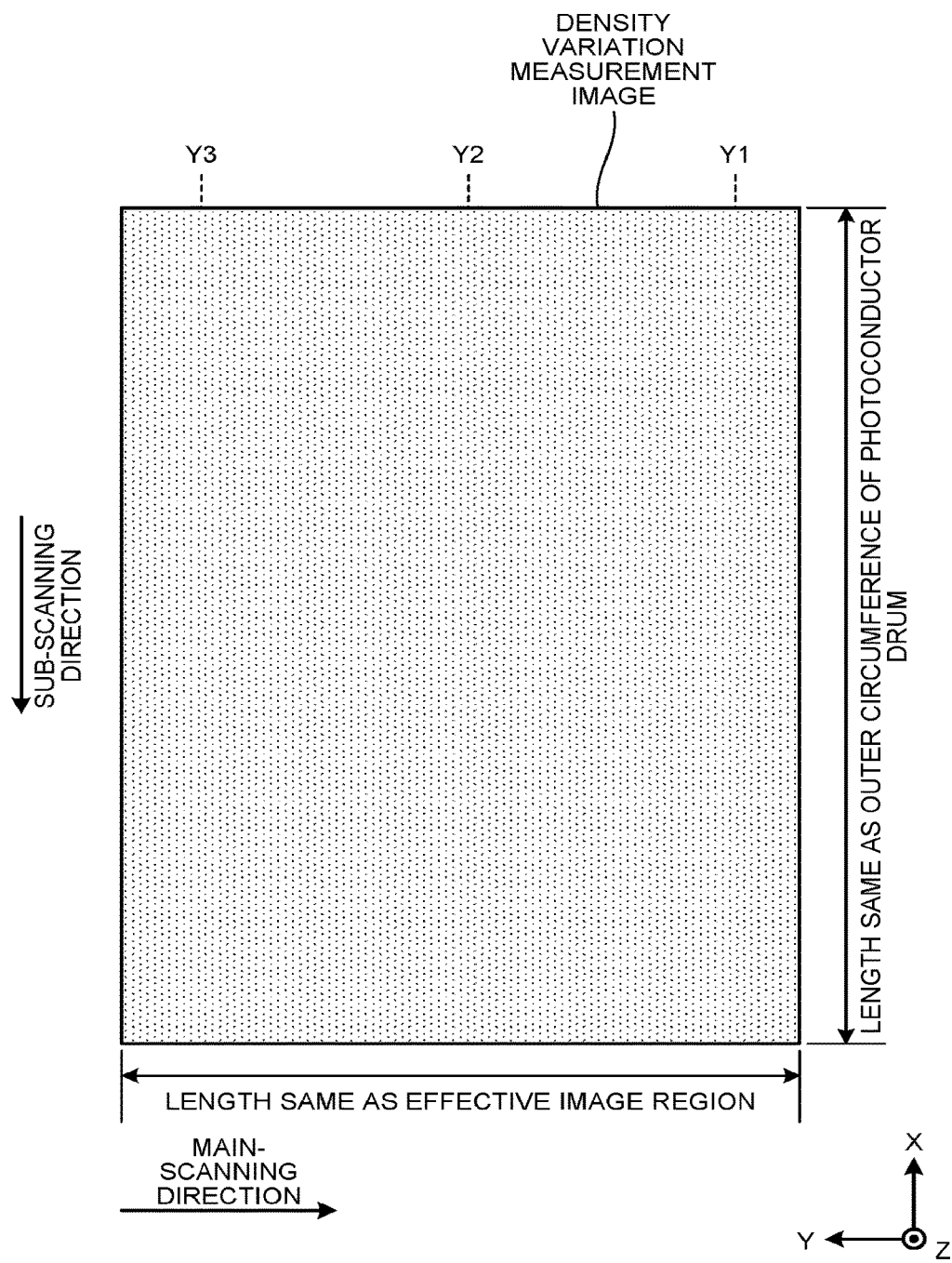
FIG. 14 is a diagram illustrating an example of a density variation measurement image.

First, at Step S111, the correction value detecting unit 3411 generates, on the transfer belt 2040, a density variation measurement image with a size corresponding to the entire region of the surface of the photoconductor drum 2030. Specifically, the correction value detecting unit 3411 generates a density variation measurement image in which a length in the main-scanning direction is the same as the length of the effective image region and a length in the sub-scanning direction is the same as an outer circumference of the photoconductor drum 2030 as illustrated in FIG. 14. Incidentally, the entire region of the density variation measurement image is formed with the same intensity data.

Figure 15:
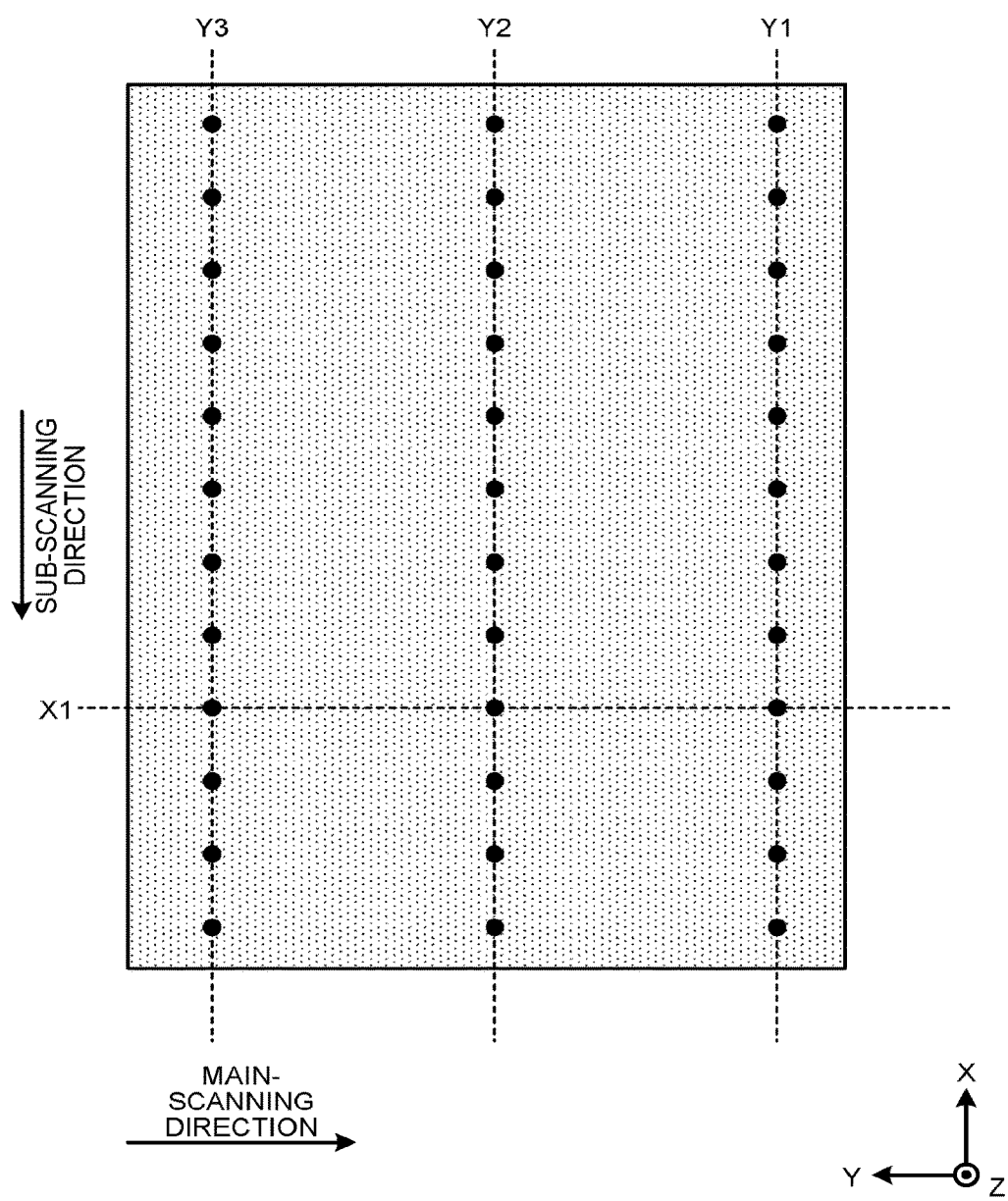
FIG. 15 is a diagram illustrating an example of toner density measurement positions detected by each of the optical sensors.

Subsequently, at Step S112, the correction value detecting unit 3411 measures a distribution of a toner density of the density variation measurement image. That is, the correction value detecting unit 3411 measures the toner density of the density variation measurement image for each position. First, the correction value detecting unit 3411 controls the three optical sensors 2245a, 2245b, and 2245c, and causes each of the optical sensors 2245a, 2245b, and 2245c to measure a toner density at each predetermined interval in the sub-scanning direction as illustrated in FIG. 15. Then, the correction value detecting unit 3411 performs fitting on the toner density at each predetermined interval in the sub-scanning direction by a high-dimensional function for each of the optical sensors 2245a, 2245b, and 2245c, and acquires a waveform indicating the toner densities at the positions in the sub-scanning direction. Therefore, the correction value detecting unit 3411 can acquire the toner densities at the respective positions in the sub-scanning direction on the positions (Y1, Y2, and Y3) of the optical sensors 2245a, 2245b, and 2245c in the main-scanning direction.

Figure 16:
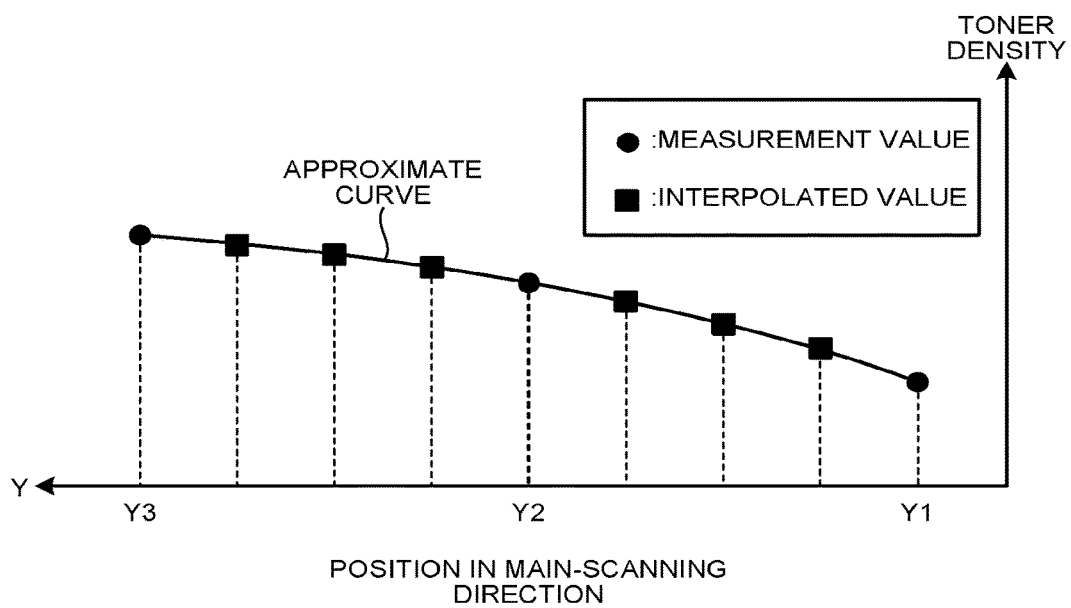
FIG. 16 is a diagram illustrating an example of interpolation of the toner density in the main-scanning direction.

Furthermore, the correction value detecting unit 3411 calculates, by interpolation, toner densities at positions in the main-scanning direction other than the positions detected by the optical sensors 2245a, 2245b, and 2245c, from the toner densities at the same positions as the positions at which the optical sensors 2245a, 2245b, and 2245c performs the measurement, in the sub-scanning direction measured. For example, the correction value detecting unit 3411 interpolates a toner density at each position in the main-scanning direction by a predetermined approximation curve as illustrated in FIG. 16, from the measurement values of the three toner densities at an arbitrary position X1 in the sub-scanning direction in FIG. 15. Therefore, the correction value detecting unit 3411 can calculate the toner density at each of the positions corresponding to the entire region of the surface of the photoconductor drum 2030.

Subsequently, at Step S113, the correction value detecting unit 3411 calculates a correction value of the toner density for each position, on the basis of the toner densities corresponding to the entire region of the surface of the photoconductor drum 2030. As one example, the correction value detecting unit 3411 subtracts the toner density calculated at Step S112 from a predetermined reference density to acquire a difference toner density for each of the positions in the entire region of the surface of the photoconductor drum 2030. For example, the correction value detecting unit 3411 acquires, from the table indicating the correspondence relation between the toner density and the intensity data, the intensity data for obtaining the toner density for the difference. Then, the correction value detecting unit 3411 outputs the intensity data acquired as described above as a correction value at each of the positions on the surface of the photoconductor drum 2030.

Subsequently, at Step S114, the correction data generating unit 3412 generates correction data for each of the positions on the surface of the photoconductor drum 2030, on the basis of the correction value at each of the positions on the surface of the photoconductor drum 2030. The content of the process at Step S114 will be described in detail later with reference to FIG. 18.

Figure 17:
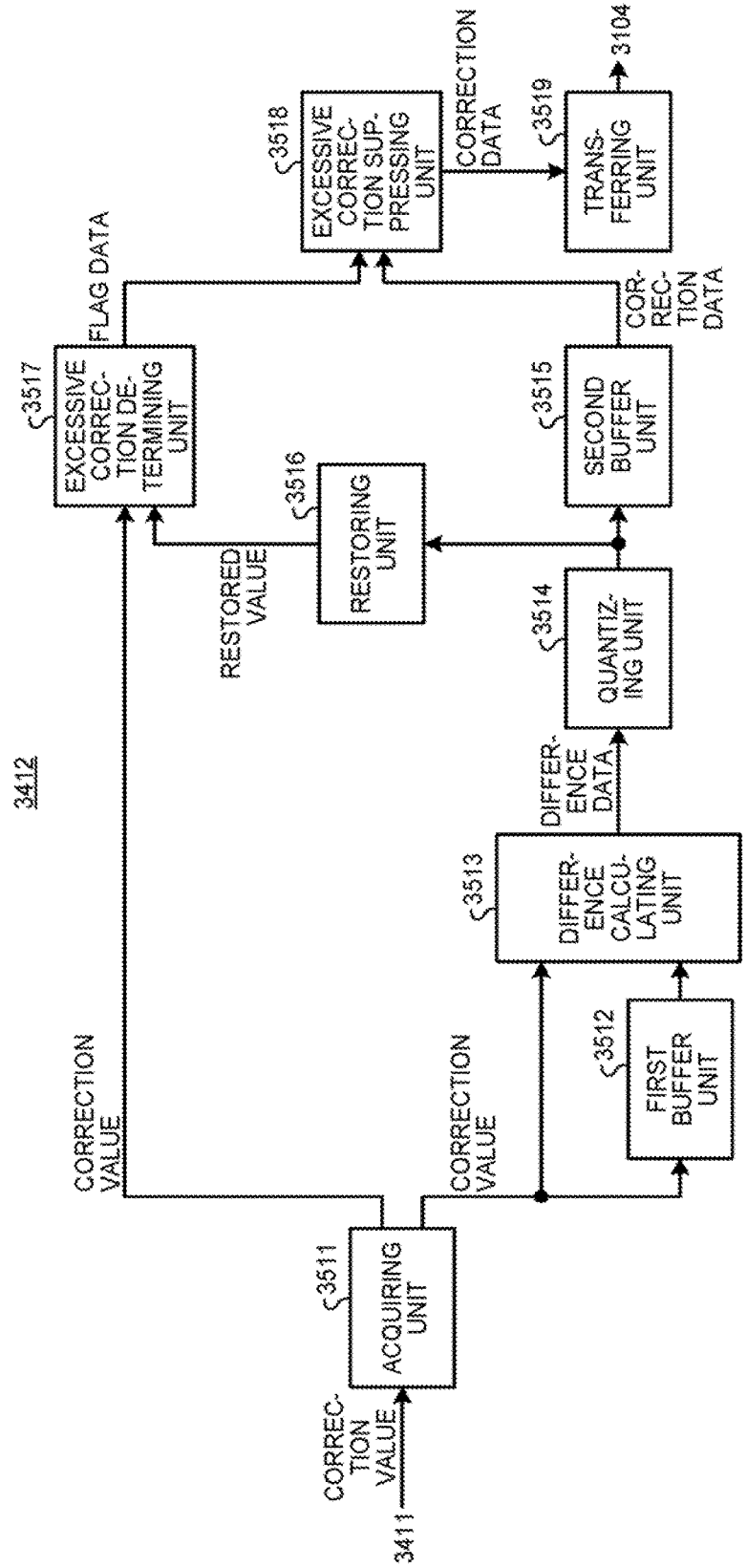
FIG. 17 is a diagram illustrating a functional configuration of a correction data generating unit.

FIG. 17 is a diagram illustrating a functional configuration of the correction data generating unit 3412. The correction data generating unit 3412 includes an acquiring unit 3511, a first buffer unit 3512, a difference calculating unit 3513, a quantizing unit 3514, a second buffer unit 3515, a restoring unit 3516, an excessive correction determining unit 3517, an excessive correction suppressing unit 3518, and a transferring unit 3519.

The acquiring unit 3511 acquires, for each position, a correction value of the intensity of the light source to equalize a density distribution of a latent image, from the correction value detecting unit 3411. The acquiring unit 3511 acquires the correction values in order of formation of the latent image on the photoconductor drum 2030, that is, in order of irradiation positions irradiated with the laser light by the optical scanning device 2010.

The first buffer unit 3512 temporarily stores therein the correction values acquired by the acquiring unit 3511. The difference calculating unit 3513 generates, for each latent image formation position on the photoconductor drum 2030, difference data indicating a difference of a correction value at each latent image formation position from the correction value at the immediately preceding latent image formation position. As one example, the difference calculating unit 3513 generates difference data by subtracting a correction value at each latent image formation position acquired by the acquiring unit 3511 from the correction value at the immediately preceding latent image formation position stored in the first buffer unit 3512.

The quantizing unit 3514 generates correction data for each position by quantizing the correction value for each position. In the embodiment, the quantizing unit 3514 generates the correction data for each position by quantizing the difference data calculated by the difference calculating unit 3513.

Incidentally, the quantizing unit 3514 generates the correction data such that an upper limit of an absolute value of the amount of change from the immediately preceding latent image formation position is limited. As one example, the quantizing unit 3514 limits the correction data such that the absolute value of the amount of change per predetermined pixels becomes equal to or smaller than a preset upper limit. For example, if the amount of change in the intensity per one pixel at 1200 dpi is greater than 2% of the maximum amplitude, a linear defect is likely to appear in a formed image. Therefore, for example, in the case of the pixel density of 1200 dpi, the quantizing unit 3514 limits the correction data such that the amount of change becomes equal to or greater than 0.5% and equal to or smaller than 2% of the maximum amplitude of the intensity per one pixel. Therefore, the quantizing unit 3514 can form a high-quality image while preventing a linear defect from appearing in the formed image.

In the embodiment, pixels are formed at 1200 dpi, and ±33% of the intensity of the light source 2200 is controlled by 9-bit intensity data. The resolution of one step of the intensity data is about 0.125% of the maximum amplitude of the intensity. Therefore, in the embodiment, the quantizing unit 3514 limits the correction data by employing the amount of change corresponding to four steps per four pixels as an upper limit.

The second buffer unit 3515 temporality stores therein the correction data quantized by the quantizing unit 3514.

The restoring unit 3516 generates a restored value indicating a correction amount of the intensity data on the basis of the correction data generated by the quantizing unit 3514. In the embodiment, the restoring unit 3516 generates the restored value by accumulating pieces of correction data that are generated by quantizing the difference data.

The excessive correction determining unit 3517 inputs the correction value acquired by the acquiring unit 3511 for each position. Furthermore, the excessive correction determining unit 3517 inputs a restored value at a position corresponding to the acquired correction value. Then, the excessive correction determining unit 3517 determines whether excessive correction is performed at the position based on the correction value and the restored value. More specifically, the excessive correction determining unit 3517 determines whether an absolute value of the restored value exceeds an absolute value of the correction value. Then, the excessive correction determining unit 3517 generates flag data of 1 for a position at which the absolute value of the restored value does not exceed the absolute value of the correction value, and generates flag data of 0 for a position at which the absolute value of the restored value exceeds the absolute value of the correction value.

The excessive correction suppressing unit 3518 inputs the correction data from the second buffer unit 3515 and inputs the flag data generated by the excessive correction determining unit 3517 for each position. Then, the excessive correction suppressing unit 3518 outputs the correction data with an unchanged value for the position at which the absolute value of the restored value does not exceed the absolute value of the correction value, and outputs the correction data after reducing an amount of change from the immediately preceding latent image formation position for the position at which the absolute value of the restored value exceeds the absolute value of the correction value.

As one example, the excessive correction suppressing unit 3518 outputs correction data after making the amount of change from the immediately preceding latent image formation position zero, for the position at which the absolute value of the restored value exceeds the absolute value of the correction value. In the embodiment, the correction data indicates a difference in the correction amount relative to the immediately preceding latent image formation position. Therefore, as one example, the excessive correction suppressing unit 3518 multiplies the correction data by the flag data for each position, and outputs the correction data of 0 for the position at which the absolute value of the restored value exceeds the absolute value of the correction value.

The transferring unit 3519 transfers the correction data output from the excessive correction suppressing unit 3518 to the modulating unit 3104, and writes the correction data in the correction data storage unit 3254. In the embodiment, the correction data indicates the amount of change from the immediately preceding latent image formation position. Therefore, the transferring unit 3519 can reduce the amount of transfer regarding the correction data to the modulating unit 3104.

Figure 18:
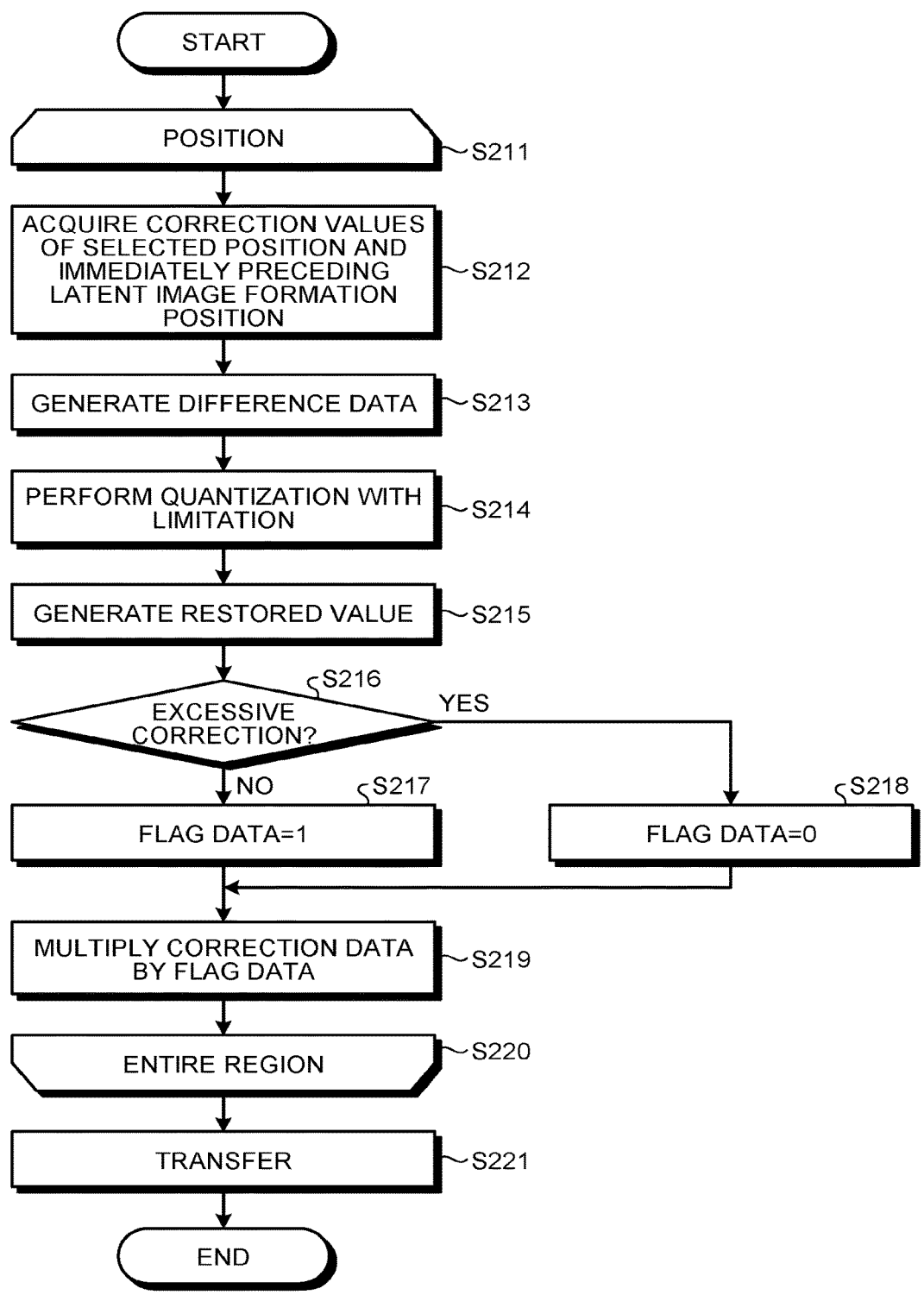
FIG. 18 is a flowchart illustrating the flow of a process performed by the correction data generating unit.

FIG. 18 is a flowchart illustrating the flow of a process performed by the correction data generating unit 3412. The correction data generating unit 3412 generates correction data according to the flow illustrated in FIG. 18.

First, the correction data generating unit 3412 sequentially selects positions on the photoconductor drum 2030 in order of formation of a latent image, and repeats processes from Step S212 to Step S218 for each selected position (a loop process between Step S211 and Step S219). A unit of selection of the position may be a unit of pixel or a unit of a region of predetermined pixels.

In the loop process, first, at Step S212, the correction data generating unit 3412 acquires a correction value at the selected position and a correction value at an immediately preceding latent image formation position. Subsequently, at Step S213, difference data indicating a difference of the correction value at the selected position from the correction value at the immediately preceding latent image formation position is generated.

Subsequently, at Step S214, the correction data generating unit 3412 generates correction data by quantizing the difference data. In this case, the correction data generating unit 3412 limits an upper limit of an absolute value of the amount of change from the immediately preceding latent image formation position with respect to the correction data. In the embodiment, the correction data generating unit 3412 employs four steps per four pixels as the upper limit of the amount of change. Therefore, if the amount of change is greater than four steps per four pixels, the correction data generating unit 3412 limits the correction data at this position by four steps.

Subsequently, at Step S215, the correction data generating unit 3412 accumulates pieces of correction data generated through quantization with a limitation, and generates a restored value. More specifically, the correction data generating unit 3412 generates the restored value by adding the correction data at the selected position to a restored value at the immediately preceding latent image formation position.

Subsequently, at Step S216, the correction data generating unit 3412 determines whether excessive correction is performed. More specifically, the correction data generating unit 3412 determines whether the absolute value of the restored value exceeds the absolute value of the correction value. When determining that the absolute value of the restored value does not exceed the absolute value of the correction value (NO at Step S216), the correction data generating unit 3412 sets the flag data to 1 at Step S217. When determining that the absolute value of the restored value exceeds the absolute value of the correction value (YES at Step S216), the correction data generating unit 3412 sets the flag data to 0 at Step S218.

When the process at Step S217 or Step S218 is completed, the correction data generating unit 3412 multiplies the correction data by the flag data at Step S219. Therefore, the correction data generating unit 3412 can output correction data with an unchanged value for the position at which the absolute value of the restored value does not exceed the absolute value of the correction value, and output correction data with a value of 0 for the position at which the absolute value of the restored value exceeds the absolute value of the correction value.

When the correction data generating unit 3412 completes the processes from Step S212 to Step S219 on the positions corresponding to the entire region of the photoconductor drum 2030, the process proceeds to Step S221 (Step S220). At Step S221, the correction data generating unit 3412 transfers the generated correction data to the modulating unit 3104, and writes the correction data in the correction data storage unit 3254.

Figures 19, 20:
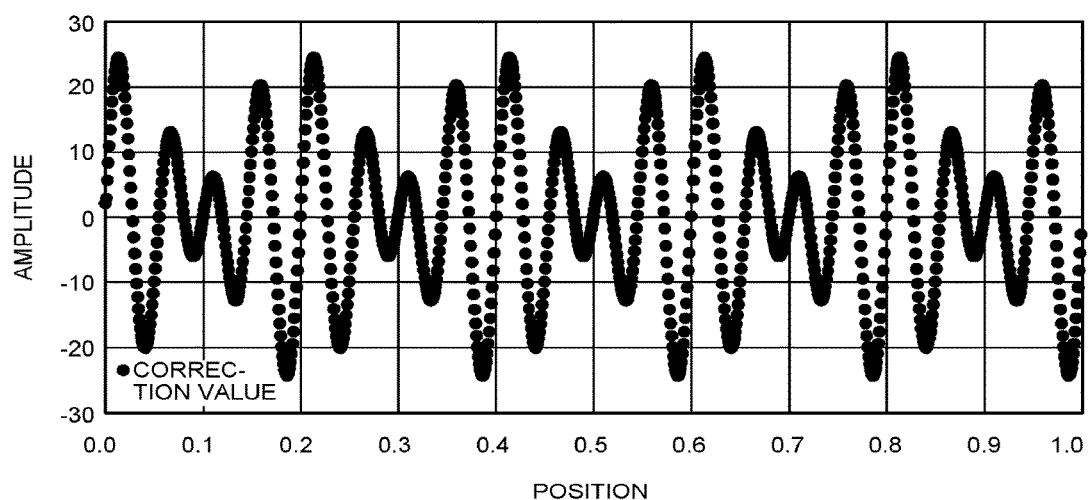
FIG. 19 is a waveform diagram illustrating an example of a simulation result of correction values with respect to positions.
FIG. 20 is a diagram illustrating an example of values of positions, correction values, and difference data.

FIG. 19 is a waveform diagram illustrating an example of a simulation result of correction values with respect to positions. The correction value corresponding to a position in the main-scanning direction or the sub-scanning direction on the surface of the photoconductor drum 2030 is a value that continuously changes as illustrated in FIG. 19. The correction data generating unit 3412 acquires the correction value as described above from the correction value detecting unit 3411.

FIG. 20 is a diagram illustrating an example of values of positions, correction values, and difference data. The difference calculating unit 3513 calculates difference data for each predetermined interval. In the example in FIG. 20, the difference calculating unit 3513 calculates difference data of a correction value per four pixels. Therefore, the difference calculating unit 3513 calculates, per four pixels, difference data by subtracting, from a correction value at a current pixel, a correction value at a pixel four pixels before the current pixel.

FIG. 21 is a diagram illustrating an example of values of correction data quantized with a limitation on the amount of change. The quantizing unit 3514 generates correction data by quantizing the difference data. In the example illustrated in FIG. 21, the quantizing unit 3514 generates the correction data by rounding off the difference data as an integer.

Furthermore, the quantizing unit 3514 limits an upper limit of an absolute value of the correction data. In the example illustrated in FIG. 21, when an absolute value of a quantized value of the difference data is equal to or greater than four, the quantizing unit 3514 limits the correction data to four. That is, the quantizing unit 3514 limits the correction data to four when the difference data is equal to or greater than four, and limits the correction data to minus four when the difference data is equal to or smaller than minus four. If the difference data is greater than minus four and smaller than four, the quantizing unit 3514 employs the integer obtained by rounding off the difference data as the correction data. The quantizing unit 3514 can prevent a black line or the like on an image by limiting the upper limit of the absolute value of the correction data as described above.

Figure 22:
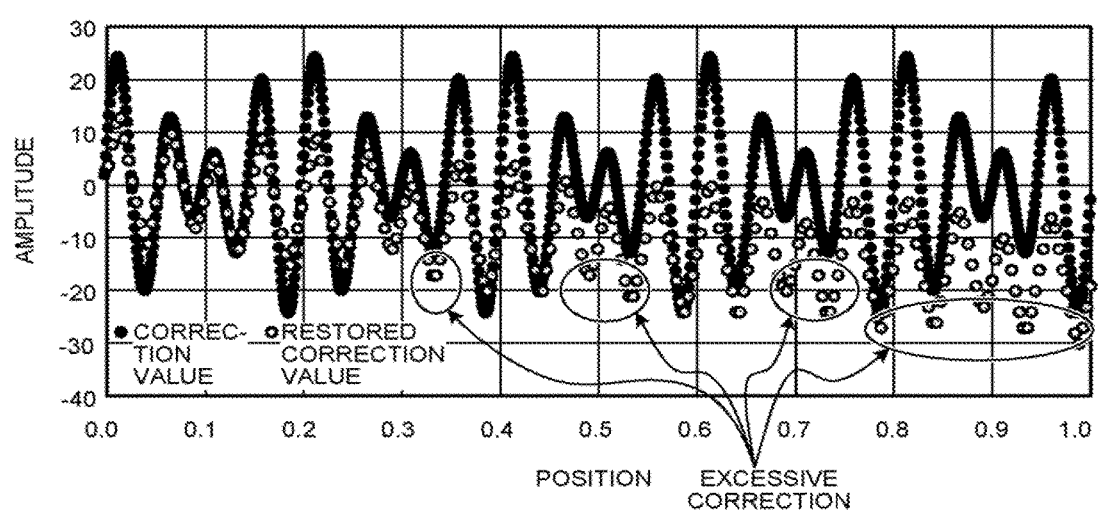
FIG. 22 is a waveform diagram illustrating an example of correction values and restored correction values with respect to positions.

FIG. 22 is a waveform diagram illustrating an example of correction values and restored correction values with respect to positions. It is assumed that a correction amount is generated by restoring the correction data generated by the quantizing unit 3514 as it is. In this case, the restored correction amount may lead to excessive correction with a greater absolute value than an original correction value. For example, portions indicated by circles in FIG. 22 are portions where the excessive correction is performed. If the excessive correction occurs, greater correction than a toner density to be corrected may be performed, and density unevenness may be increased as compared to the case where the correction is not performed.

A cause of the excessive correction may be as follows. Specifically, in a portion at which a steep inclination occurs in a change in the correction value, the change in the correction data does not follow a change in a correction value to be originally applied (that is, an original correction value) because of a process for limitation. However, if a moderate inclination subsequently continues in a change in the correction value, the change in the correction data can follow the change in the original correction value, and a residual caused by the steep inclination results in excessive correction. That is, inconsistency occurs such that the correction data cannot follow the steep inclination and the correction data cannot follow the moderate inclination, which leads to excessive correction.

FIG. 23 is a diagram illustrating an example of values of positions, correction values, difference data, correction data quantized with a limitation on the amount of change, restored values, and flag data. The excessive correction determining unit 3517 determines whether excessive correction is performed based on an original correction value and a restored value that is restored by accumulating pieces of correction data. Specifically, the excessive correction determining unit 3517 determines whether the absolute value of the restored value is equal to or greater than the absolute value of the correction value.

The excessive correction determining unit 3517 generates flag data of 1 when the absolute value of the restored value is not equal to or greater than the absolute value of the correction value, and flag data of 0 when the absolute value of the restored value is equal to or greater than the absolute value of the correction value. Therefore, the excessive correction determining unit 3517 can specify correction data at a position at which excessive correction occurs.

FIG. 24 is a diagram further illustrating an example of values of correction data after suppressing excessive correction. The excessive correction suppressing unit 3518 multiplies the correction data, which is quantized with a limitation, by the flag data. Therefore, the excessive correction suppressing unit 3518 can make the correction data zero when the absolute value of the restored value is equal to or greater than the absolute value of the correction value, and maintain the correction data as it is when the absolute value of the restored value is not equal to or greater than the absolute value of the correction value. As a result, the excessive correction suppressing unit 3518 can correct the intensity data for the position at which excessive correction does not occur, and make the amount of change in the correction amount of the intensity data zero for the position at which excessive correction occurs.

Figure 25:
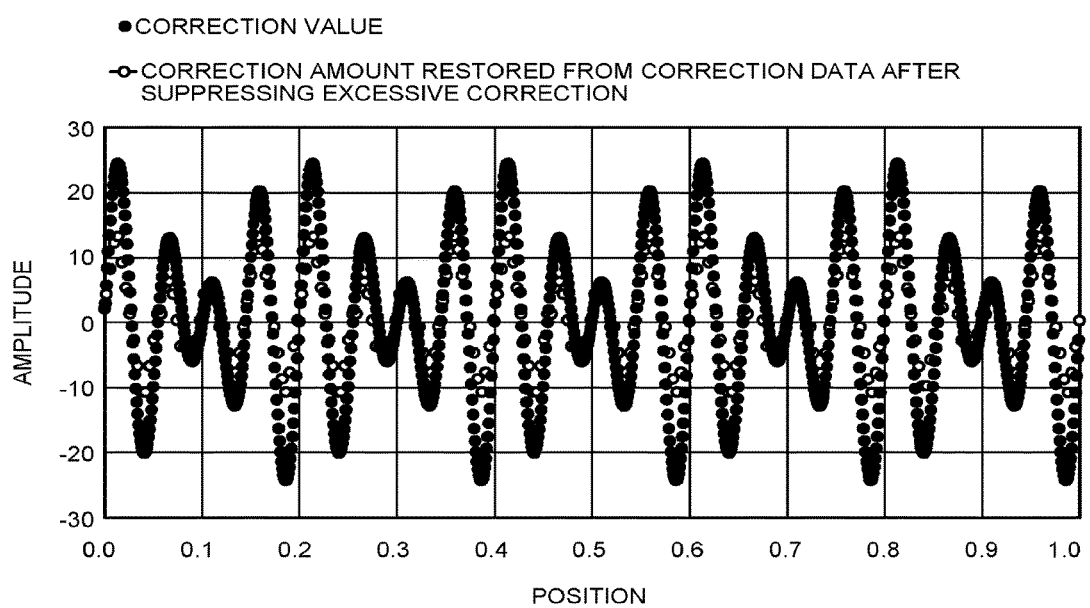
FIG. 25 is a waveform diagram illustrating an example of correction values and correction values restored from the correction data after suppressing excessive correction, with respect to positions.

FIG. 25 is a waveform diagram illustrating an example of a correction value with respect to a position and an example of a correction amount restored from the correction data after suppressing excessive correction. As illustrated in FIG. 25, the correction amount restored from the correction data after suppressing excessive correction follows original correction values in a range where the correction amount does not exceed the original correction values.

As described above, the correction data generating unit 3412 according to the embodiment can generate the correction data that follows in the range where the original correction value is not exceeded. Therefore, according to the color printer 2000 of the embodiment, it is possible to correct the intensity of the light source 2200 with accuracy and form a high-quality image.

According to an embodiment of the present invention, it is possible to correct the intensity of a light source with high accuracy and form a high-quality image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
   a latent image bearer;
   a latent image forming unit that includes a light source that emits light with intensity corresponding to image data, and forms a latent image on the latent image bearer with the light from the light source;
   a correction data generating unit that generates correction data of an intensity of the light source for each position on the latent image bearer; and
   a correcting unit that corrects the intensity of the light source by a correction amount based on the correction data when the latent image forming unit forms a latent image,
   wherein the correction data generating unit includes:
      an acquiring unit that acquires, for each position, a correction value of an intensity of the light source to equalize a density distribution of a latent image;
      a quantizing unit that generates the correction data for each position by quantizing the correction value for each position;
      a restoring unit that generates a restored value indicating the correction amount based on the correction data; and
      an excessive correction suppressing unit that outputs the correction data after reducing an amount of change from an immediately preceding latent image formation position, with respect to a position at which an absolute value of the restored value exceeds an absolute value of the correction value, and
   wherein the excessive correction suppressing unit outputs the correction data after making the amount of change from the immediately preceding latent image formation position zero, with respect to the position at which the absolute value of the restored value exceeds the absolute value of the correction value.

2. The image forming apparatus according to claim 1, wherein:
   the correction data generating unit further includes a difference calculating unit that generates, for each position, difference data indicating a difference from a correction value at each position, from a correction value at an immediately preceding latent image formation position, and
   the quantizing unit generates the correction data for each position by quantizing the difference data.

3. The image forming apparatus according to claim 2, wherein the quantizing unit generates the correction data with a limitation on an upper limit of an absolute value of an amount of change from an immediately preceding latent image formation position.

4. The image forming apparatus according to claim 3, wherein:
   the correction data generating unit further includes an excessive correction determining unit that determines whether the absolute value of the restored value exceeds the absolute value of the correction value, and generates flag data of 1 for a position at which the absolute value of the restored value does not exceed the absolute value of the correction value and flag data of 0 for a position at which the absolute value of the restored value exceeds the absolute value of the correction value, and
   the excessive correction suppressing unit multiplies the correction data by the flag data for each position.

5. The image forming apparatus according to claim 1, further comprising:
   a memory that stores therein the correction data for each position,
   wherein when the latent image forming unit forms a latent image, the correcting unit reads the correction data corresponding to a latent image formation position from the memory and corrects the intensity of the light source.

6. The image forming apparatus according to claim 5, wherein the correction data generating unit is configured to transfer and write the correction data to the memory.

7. The image forming apparatus according to claim 1, wherein the correction data generating unit updates the correction data when a mechanical configuration of one of the latent image bearer and the latent image forming unit is adjusted.

8. A correction data generation method implemented by an image forming apparatus including:
   a latent image bearer; and
   a latent image forming unit that includes a light source that emits light with intensity corresponding to image data, and forms a latent image on the latent image bearer with the light from the light source,
   the correction data generation method being for generating the correction data of the intensity of the light source for each position on the latent image bearer, and comprising:
   acquiring, by circuitry, a correction value of the intensity of the light source to equalize a density distribution of a latent image, for each position;
   generating, by the circuitry, the correction data for each position by quantizing the correction value for each position;
   generating, by the circuitry, a restored value indicating the correction amount based on the correction data; and
   outputting, by the circuitry, the correction data after reducing an amount of change from an immediately preceding latent image formation position, with respect to a position at which an absolute value of the restored value exceeds an absolute value of the correction value, wherein the outputting outputs the correction data after making the amount of change from the immediately preceding latent image formation position zero, with respect to the position at which the absolute value of the restored value exceeds the absolute value of the correction value.

9. An image forming apparatus comprising:
a latent image bearer;
a latent image forming unit that includes a light source that emits light with intensity corresponding to image data, and forms a latent image on the latent image bearer with the light from the light source;
correction data generating circuitry that generates correction data of an intensity of the light source for each position on the latent image bearer; and
correcting circuitry that corrects the intensity of the light source by a correction amount based on the correction data when the latent image forming unit forms a latent image,
wherein the correction data generating circuitry performs:
acquiring, for each position, a correction value of an intensity of the light source to equalize a density distribution of a latent image;
generating the correction data for each position by quantizing the correction value for each position;
generating a restored value indicating the correction amount based on the correction data; and
outputting the correction data after reducing an amount of change from an immediately preceding latent image formation position, with respect to a position at which an absolute value of the restored value exceeds an absolute value of the correction value, and
wherein the outputting outputs the correction data after making the amount of change from the immediately preceding latent image formation position zero, with respect to the position at which the absolute value of the restored value exceeds the absolute value of the correction value.

10. The image forming apparatus according to claim 9, wherein:
the correction data generating circuitry further performs generating, for each position, difference data indicating a difference from a correction value at each position, from a correction value at an immediately preceding latent image formation position, and
the generating the correction data for each position by quantizing generates the correction data for each position by quantizing the difference data.

11. The image forming apparatus according to claim 10, wherein the generating the correction data for each position by quantizing generates the correction data with a limitation on an upper limit of an absolute value of an amount of change from an immediately preceding latent image formation position.

12. The image forming apparatus according to claim 11, wherein:
the correction data generating circuitry further performs determining whether the absolute value of the restored value exceeds the absolute value of the correction value, and generating flag data of 1 for a position at which the absolute value of the restored value does not exceed the absolute value of the correction value and flag data of 0 for a position at which the absolute value of the restored value exceeds the absolute value of the correction value, and
the outputting multiplies the correction data by the flag data for each position.

13. The image forming apparatus according to claim 9, further comprising:
a memory that stores therein the correction data for each position,
wherein when the latent image forming unit forms a latent image, the correcting circuitry reads the correction data corresponding to a latent image formation position from the memory and corrects the intensity of the light source.

14. The image forming apparatus according to claim 13, wherein the correction data generating circuitry is configured to transfer and write the correction data to the memory.

15. The image forming apparatus according to claim 9, wherein the correction data generating circuitry updates the correction data when a mechanical configuration of one of the latent image bearer and the latent image forming unit is adjusted.

* * * * *